(12) United States Patent
Lee et al.

(10) Patent No.: US 9,996,309 B2
(45) Date of Patent: Jun. 12, 2018

(54) METHOD AND APPARATUS FOR PROVIDING SEARCH INFORMATION

(71) Applicant: SAMSUNG ELECTRONICS CO., LTD., Suwon-si, Gyeonggi-do (KR)

(72) Inventors: Young-Eun Lee, Seoul (KR); Do-Hyun Pyun, Suwon-si (KR); Tae-Jin Woo, Suwon-si (KR); Seung-Ku Kim, Cheongju-si (KR); Bo-Seok Moon, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/366,468

(22) Filed: Dec. 1, 2016

(65) Prior Publication Data

US 2017/0161004 A1  Jun. 8, 2017

(30) Foreign Application Priority Data

Dec. 2, 2015 (KR) .................. 10-2015-0170913

(51) Int. Cl.
*G08B 1/08* (2006.01)
*G06F 3/14* (2006.01)
(Continued)

(52) U.S. Cl.
CPC .............. *G06F 3/14* (2013.01); *H04W 4/005* (2013.01); *H04W 4/70* (2018.02); *A42B 3/042* (2013.01)

(58) Field of Classification Search
CPC ......... G06F 3/14; G08B 25/00; G08B 27/001; G08B 25/016
(Continued)

(56) References Cited

U.S. PATENT DOCUMENTS 7,652,571 B2 * 1/2010 Parkulo ................. G01S 13/878
                                                        340/525
8,965,688 B2 * 2/2015 Bandyopadhyay .... G01C 17/38
                                                        701/1
(Continued)

FOREIGN PATENT DOCUMENTS

KR   10-2011-0125332   11/2011

OTHER PUBLICATIONS

Search Report and Written Opinion dated Feb. 24, 2017 in counterpart International Patent Application No. PCT/KR2016/013984.

*Primary Examiner* — Toan N Pham
(74) *Attorney, Agent, or Firm* — Nixon & Vanderhye P.C.

(57) ABSTRACT

The present disclosure relates to technologies for sensor networks, machine-to-machine (M2M), machine-type communication (MTC), and Internet of things (IoT). The present disclosure may be used in intelligent services (smart home, smart building, smart city, smart car, or connected car, health-care, digital education, retail business, security and safety-related services, etc.) A method and apparatus for transmitting information in a communication system are provided. According to the present disclosure, an electronic device receives sensing data from at least one sensor, receives a distress signal from at least one user device, and displays search information for guiding to an area to be searched determined based on the sensing data and the distress signal through a display screen of a wearable device.

15 Claims, 18 Drawing Sheets

(51) Int. Cl.
*H04W 4/00* (2018.01)
*A42B 3/04* (2006.01)

(58) Field of Classification Search
USPC .......... 340/539.18, 539.11, 539.13, 539.26,
340/573.1; 348/199
See application file for complete search history.

(56) References Cited

U.S. PATENT DOCUMENTS

| | | |
|---|---|---|
| 9,726,503 B2* | 8/2017 | Moore .................. G01C 21/206 |
| 2002/0196202 A1 | 12/2002 | Bastian et al. |
| 2012/0256769 A1 | 10/2012 | Satpathy |
| 2013/0024117 A1 | 1/2013 | Pavetti et al. |
| 2013/0169817 A1* | 7/2013 | Jones ..................... G08B 25/14 |
| | | 348/159 |
| 2013/0201016 A1 | 8/2013 | Lo et al. |

* cited by examiner

METHOD AND APPARATUS FOR PROVIDING SEARCH INFORMATION

CROSS-REFERENCE TO RELATED APPLICATION

This application is based on and claims priority under 35 U.S.C. § 119 to a Korean patent application filed in the Korean Intellectual Property Office on Dec. 2, 2015 and assigned Serial No. 10-2015-0170913, the disclosure of which is incorporated by reference herein in its entirety.

TECHNICAL FIELD

The present disclosure relates generally to methods and apparatuses for providing search information.

BACKGROUND

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infrastructure, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Portable electronic devices may come in hand-held or wearable types. Electronic devices wearable on users' bodies are typically called wearable devices, and head-mounted displays (HMID) or other head-mounted devices are among such wearable devices.

Such a head-mounted electronic device is worn on a user's body part (e.g., his head), providing a display screen and letting his hands free while he is on the move. The display screen may be intended for providing information necessary for search or rescue to the user, e.g., a firefighter or adventurer.

The above information is presented as background information only to assist with an understanding of the present disclosure.

SUMMARY

According to the present disclosure, a method and apparatus for displaying information for search and/or rescue by an electronic device are provided.

According to the present disclosure, a method and apparatus for efficiently selecting an area to be first searched or rescued are provided.

According to the present disclosure, \a method and apparatus for displaying information about a distress and choosing a rescue area by a rescuer's terminal communicating with a rescuee's terminal and sensors in the site are provided.

According to an example embodiment of the present disclosure, a method for providing search information comprises receiving sensing data from at least one sensor, receiving a distress signal from at least one user device, and displaying the search information for guiding to an area to be searched determined based on the sensing data and the distress signal through a display screen of a wearable device.

According to an example embodiment of the present disclosure, a method for providing search information comprises receiving sensing data from at least one sensor, receiving rescuee information generated based on a distress signal transmitted from at least one user device, determining a predetermined area based on the sensing data and the rescuee information, and transmitting search information for guiding to the determined area to a wearable device to be displayed on a display screen of the wearable device.

According to an example embodiment of the present disclosure, a wearable device providing search information comprises a communication module comprising communication circuitry configured to receive sensing data from at least one sensor and to receive a distress signal from at least one user device and a display configured to display the search information for guiding to a determined area through a display screen of the wearable device, the determined area being determined based on the sensing data and the distress signal.

According to an example embodiment of the present disclosure, a server providing search information comprises a communication module comprising communication circuitry configured to receive sensing data from at least one sensor and to receive rescuee information generated based on a distress signal transmitted from at least one user device and a processor configured to determine an area based on the sensing data and the rescuee information and to transmit the search information for guiding to the determined area through the communication circuitry to a wearable device to be displayed on a display screen of the wearable device.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

Various example embodiments of the present disclosure and the foregoing and other aspects, features, and advantages will be apparent from the following detailed description, taken in conjunction with the accompanying drawings, in which like reference numerals refer to like elements, and wherein.

DETAILED DESCRIPTION

Figure 1:
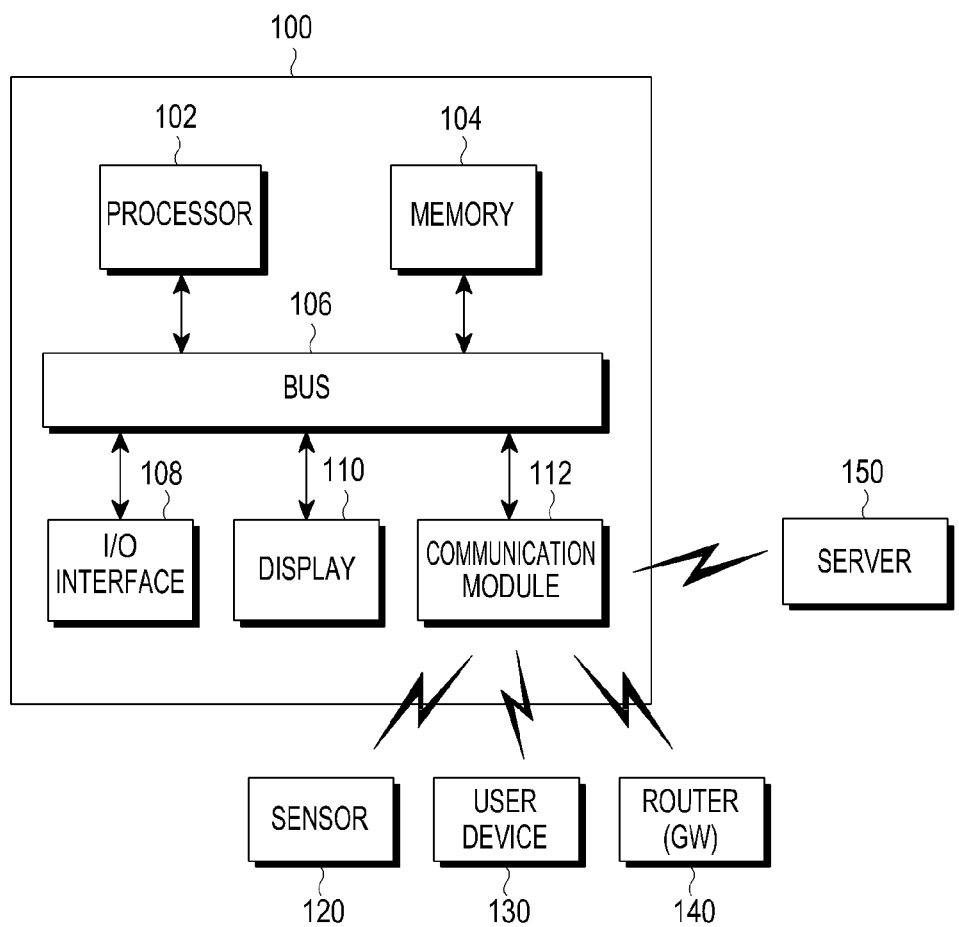
FIG. 1 is a block diagram illustrating an example electronic device and network according to an example embodiment of the present disclosure.

Hereinafter, example embodiments of the present disclosure are described in greater detail with reference to the accompanying drawings.

In describing the example embodiments, the description of technologies that are known in the art and that are not directly related to the present disclosure may be omitted for the sake of clarity.

For the same reasons, some elements may be exaggerated or schematically illustrated. The size of each element does not necessarily reflect the real size of the element. The same reference numeral is used to refer to the same element throughout the drawings.

Advantages and features of the present disclosure, and methods for achieving the same may be understood through the various example embodiments to be described below with reference to the accompanying drawings. However, the present disclosure is not limited to the example embodiments disclosed herein, and various changes may be made thereto. The example embodiments disclosed herein are provided only to inform one of ordinary skilled in the art of the category of the present disclosure. The present disclosure is defined by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a dedicated processor, a special-use computer or other programmable data processing devices, the instructions executed through a processor of a computer or other programmable data processing devices cause the devices and/or processors to perform the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instructions for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" may refer, for example, to a software element or a hardware element such as processing circuitry, a field-programmable gate array (FPGA) or an application specific integrated circuit (ASIC), or the like, but is not limited thereto. A unit plays a certain role. However, the term "unit" is not limited as meaning a software and/or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be separated into sub elements or sub units. Further, an element or a 'unit' may be implemented to reproduce one or more CPUs in a device or a security multimedia card.

Although the description of example embodiments herein mentions particular communication protocols, systems, and services, the subject matter of the present disclosure may also be applicable to other communication schemes or services having similar technical backgrounds without departing from the scope of the present disclosure, and this may be determined by one of ordinary skill in the art.

For example, examples of the electronic device of the various exmple embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device, or the like, but is not limited thereto. According to an example embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to an example embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto.

According to an example embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler), or the like but is not limited thereto.

According to various example embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves), or the like, but is not limited thereto. According to an example embodiment of the present disclosure, the electronic device may be one or a combination of the above-listed devices. According to an example embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various example embodiments of the present disclosure. As used herein, the term "user" may denote a human or another device (e.g., an artificial intelligent electronic device) using the electronic device.

FIG. 1 is a block diagram illustrating an example electronic device and network according to an example embodiment of the present disclosure.

Referring to FIG. 1, according to an example embodiment of the present disclosure, an electronic device 100 in a network environment is described. The electronic device 100, as a device carriable by the user, may include a bus 106, a processor (e.g., including processing circuitry) 102, a memory 104, an input/output (I/O) interface (e.g., including I/O interface circuitry) 108, a display 110, and a communication module (e.g., including communication circuitry) 112. In some embodiments, the electronic device 100 may exclude at least one of the components or may add another component.

The bus 106 may include a circuit for connecting the components 102, 104, 108, 110, and 112 with one another and transferring communications (e.g., control messages and/or data) between the components.

The processing module 102 may include various processing circuitry, such as, for example, and without limitation, one or more of a central processing unit (CPU), an application processor (AP), or a communication processor (CP). The processor 102 may perform control on at least one of the other components of the electronic device 100, and/or perform an operation or data processing relating to communication.

The memory 104 may include a volatile and/or non-volatile memory. For example, the memory 104 may store commands or data related to at least one other component of the electronic device 100. According to an example embodiment of the present disclosure, the memory 104 may store software and/or a program. The program may include, e.g., a kernel, middleware, an application programming interface (API), and/or an application program (or an application). At least a portion of the kernel, middleware, or API may be denoted an operating system (OS).

The input/output interface 108 may include various input/output interface circuitry configured to serve as an interface that may, e.g., transfer commands or data input from a user or other external devices to other component(s) of the electronic device 100. Further, the input/output interface 108 may output commands or data received from other component(s) of the electronic device 100 to the user or the other external device.

The display 110 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 110 may display, e.g., various types of information (e.g., text, images, videos, icons, or symbols) to the user. The display 110 may include a touchscreen and may receive, e.g., a touch, gesture, proximity or hovering input using an electronic pen or a body portion of the user.

For example, the communication module 112 may include various communication circuitry configured to set up communication between the electronic device 100 and an external device. For example, the communication module 112 may be connected to a network through wireless communication or wired communication to communicate with an external device (e.g., a sensor 120, user device 130, router 140 (or an access point or gateway), and/or a server 150 in the Internet or the network).

The wireless communication may include, e.g., a cellular communication protocol and may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). Further, the wireless communication may include, e.g., short-range communication. The short-range communication may include at least one of, e.g., wireless-fidelity (Wi-Fi), bluetooth, bluetooth low energy (BLE), near-field communication (NFC), zigbee, Z-wave, or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network may include at least one of communication networks, e.g., a computer network (e.g., local area network (LAN) or wide area network (WAN)), the Internet, a telephone network, and a personal network.

The user device 130 may be of the same or different type of the electronic device 100. The sensor(s) 120 may be configured to be able to communicate by wire or wirelessly with at least one of the electronic device 100, the user device 130, the router 140, and the server 150 and to perform unique sensing operations. According to an example embodiment of the present disclosure, the server 150 may include a group of one or more servers, configured in a stationary or moveable type, and may communicate with the electronic device 100 directly or via another network entity.

According to an example embodiment of the present disclosure, all or some of operations run on the electronic device 100 may be run on another or multiple other electronic devices (e.g., the user device 130, router 140, or server 150). According to an example embodiment of the present disclosure, when the electronic device 100 should perform some function or service automatically or at a request, the electronic device 100, instead of executing the function or service on its own or additionally, may request another device (e.g., the user device 130, router 140, or the server 150) to perform at least some functions associated therewith. The other electronic device (e.g., the user device 130, router 140, or server 150) may execute the requested functions or additional functions and transfer a result of the execution to the electronic device 100. The electronic device 100 may provide a requested function or service by processing the received result as it is or additionally. To that end, a cloud computing, distributed computing, or client-server computing technique may be used, for example.

The electronic device 100 may include at least one sensing module (not shown) electrically connected with the processor 102 and obtaining ambient environmental information and/or movement information regarding the electronic device 100. The sensing module to obtain the ambient environmental information may include at least one of a temperature/humidity sensor, a bio sensor, an illumination sensor, an ultraviolet (UV) sensor, a gas sensor, a smoke sensor, and an air pressure sensor. The sensing module to obtain movement information may include at least one sensor capable of sensing various linear acceleration information, rotational angular acceleration information, and/or position information regarding the electronic device, such as a linear acceleration sensor, a gyro sensor, or a geomagnetic sensor.

The electronic device 100 may obtain the ambient environmental information and/or movement information regarding the electronic device 100 based on sensing data obtained by various sensors. The sensing data may include at least one of information identifying each sensor, a sensor type, location information, and a value sensed. As an example of the sensed value, the electronic device 100 may obtain a linear acceleration of the electronic device 100 based on sensing data from the linear acceleration sensor. The electronic device 100 may obtain a rotational angular acceleration of the electronic device 100 based on sensing data from the gyro sensor. The electronic device 100 may obtain position information and movement information regarding the electronic device 100 based on sensing data from the gyro sensor and the geomagnetic sensor.

According to an example embodiment of the present disclosure, the processor 102 may be electrically connected to the display 110. Further, the processor 102 may be electrically connected to the memory 104. The memory 104 may store instructions which, when executed, cause the processor 102 to analyze sensing data based on the sensing data and a distress signal obtained through the communication module 112 to determine an area of search and to control the display 110 to output a screen including search information for guiding the area of search.

As used herein, the term "distress signal" may refer, for example, to a signal for requesting a rescue that is sent from a device of a user in distress that is positioned near (e.g., in operable proximity to) the electronic device 100. The distress signal may include, for example, at least one of identification information, location information, bio information, sensing data, and image information regarding the user device.

As used herein, the "search information" may refer, for example to environmental information, guide information, and/or movement information regarding an area that the electronic device 100 attempts to or should search. The area guided by the search information may include an area within a predetermined distance of the electronic device 100, but without being limited thereto, may also include an area that, although not physically positioned nearby, allows the electronic device 100 to receive context information (environmental information and/or movement information) thereon by various communication schemes (including direct or indirect communication) with another device (e.g., an external sensor and/or user device) The search information may be varied over time and may be updated in real-time by communication between the electronic device 100 and various external sensors.

The electronic device 100 may further include a camera module (not shown) that captures the external environment and outputs a plurality of images to the processor 102. According to an example embodiment of the present disclosure, the memory 104 may store an algorithm for determining the number of rescuees based on data gathered externally through the communication module 112 or from an internal component, such as the camera module, and determining whether to search and determining an area of search.

Figure 2:
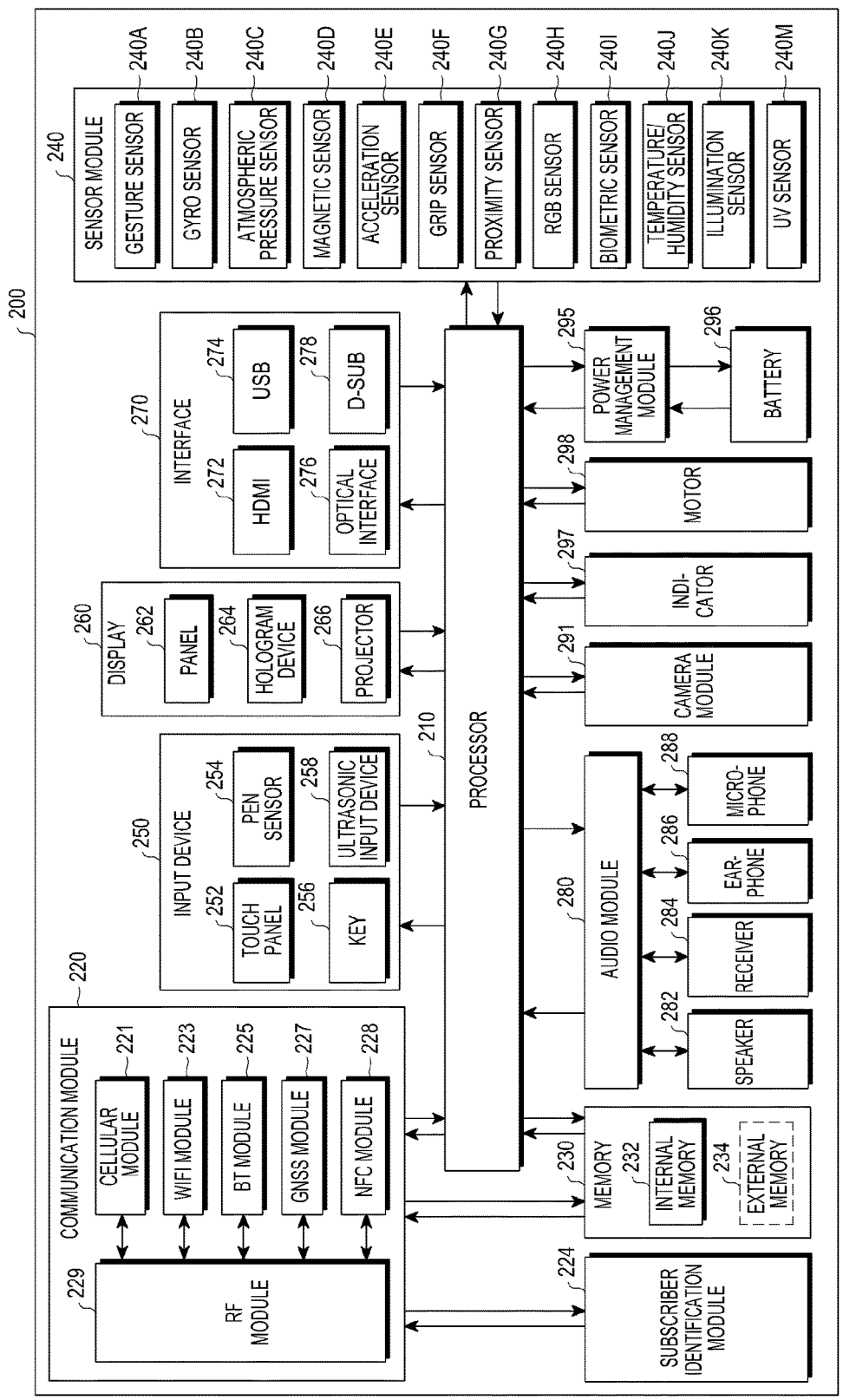
FIG. 2 is a block diagram illustrating an example user device according to an example embodiment of the present disclosure.

FIG. 2 is a block diagram illustrating an example user device according to an example embodiment of the present disclosure.

Referring to FIG. 2, the user device 200 may include the whole or part of, e.g., the user device 130 of FIG. 1. The user device 200 may include at least one of one or more processors (e.g., application processors (APs) or communication processors (CP)) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control multiple hardware and software components connected to the processor 210 by running, e.g., an operating system or application programs, and the processor 210 may process and compute various data. The processor 210 may be implemented in, e.g., various processing circuitry, a system on chip (SoC), or the like. According to an example embodiment of the present disclosure, the processor 210 may further include a graphic processing unit (GPU) and/or an image signal processor. The processor 210 may include at least some (e.g., the cellular module 221) of the components illustrated in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication module 112 of FIG. 1. The communication module 220 may include various communication circuitry, such as, for example, and without limitatin, a cellular module 221, a wireless fidelity (Wi-Fi) module 223, a Bluetooth (BT) module 225, a GNSS module 227 (e.g., a GPS module, Glonass module, Beidou module, or Galileo module), a NFC module 228, and a RF module 229. According to an example embodiment of the present disclosure, the communication module 220 may further include at least one of a BLE module, a zigbee module, and a z-wave module.

The cellular module 221 may provide voice call, video call, text, or Internet services through, e.g., a communication network. The cellular module 221 may perform identification or authentication on the user device 200 in the communication network using a subscriber identification module 224 (e.g., the SIM card). According to an example embodiment of the present disclosure, the cellular module 221 may perform at least some of the functions providable by the processor 210. According to an example embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an example embodiment of the present disclosure, at least one of the cellular module 221, the Wi-Fi module 223, the Bluetooth module 225, the GNSS module 227, or the NFC module 228 may communicate RF signals through a separate RF module.

The communication module 220 may further include, for example, a distress communication module including various circuitry that generates distress signals at a distress frequency, non-commercial frequency, or a predetermined frequency. The distress communication module may be configured to generate distress signals in response to sensing a search signal or distress alert signal from the outside, a command generated by the processor 210 as per the user's manipulation, or initiating a distress mode as per a determination by the processor 210. According to an example embodiment of the present disclosure, the distress communication module may be configured with a battery provided separately from those for other components, particularly, the processor 210 or be configured to operate at a very low battery power level.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally and/or physically connected with the user device 200 via various interfaces.

For example, the sensor module 240 may measure a physical quantity or detect a motion state of the user device 200, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an example embodiment of the present disclosure, the user device 200 may further include a processor configured to control the sensor module 240 as part of the processor 210 or separately from the processor 210, and the user device 200 may control the sensor module 240 while the processor 210 is in a sleep mode.

The input unit 250 may include various input circuitry, such as, for example, and without limitation, a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

For example, the pen sensor 254 may be part of the touch panel or may include a separate sheet for recognition. The key panel 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 110) may include a panel 262, a hologram device 264, or a projector 266. The panel 262 may have the same or similar configuration to the display 110 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the user device 200. In accordance with an embodiment, the display 260 may further include a control circuit to control the panel 262, the hologram device 264, or the projector 266.

The interface 270 may include various interface circuitry, such as, for example, and without limitation, a high definition multimedia interface (HDMI) 272, a USB 274, an optical interface 276, or a D-subminiature (D-sub) 278. The interface 270 may be included in e.g., the communication module 112 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 108 as illustrated in FIG. 1. The audio module 280 may process sound information input or output through e.g., a speaker 282, a receiver 284, an earphone 286, or a microphone 288.

For example, the camera module 291 may be a device for recording still images and videos, and may include, according to an example embodiment of the present disclosure, one or more image sensors (e.g., front and back sensors), a lens, an Image signal processor (ISP), or a flash such as an LED or xenon lamp.

The power manager module 295 may manage power of the user device 200, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the user device 200 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the user device 200. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various example embodiments of the present disclosure may include at least one of the aforementioned components, omit some of them, or include other additional component(s). Some of the components may be combined into an entity, but the entity may perform the same functions as the components may do.

Figure 3:
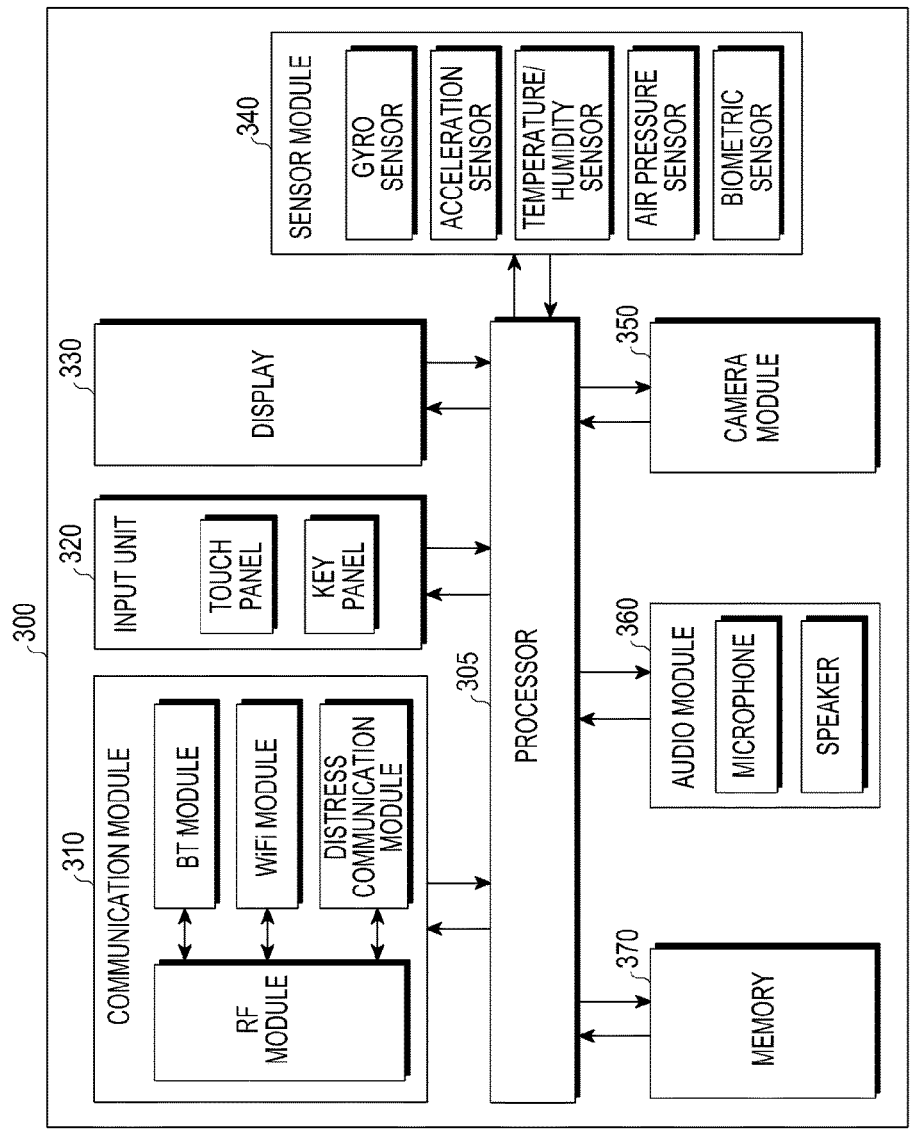
FIG. 3 is a block diagram illustrating an example electronic device according to an example embodiment of the present disclosure.

FIG. 3 is a block diagram illustrating an example electronic device according to an example embodiment of the present disclosure.

Referring to FIG. 3, the electronic device 300 may include the whole or part of, e.g., the electronic device 100 of FIG. 1. The electronic device 300 may include at least one of one or more processors (e.g., an AP and CP) 305, a communication module (e.g., including communication circuitry) 310, a memory 370, a sensor module 340, an input unit (e.g., including input circuitry) 320, a display 330, an audio module 360, and a camera module 350.

The processor 305 may include various processing circuitry configured to control multiple hardware and software components connected to the processor 305 by running, e.g., an operating system or application programs, and the processor 210 may process and compute various data. The processor 305 may include at least some (e.g., the communication module 310) of the components illustrated in FIG. 3. The processor 305 may load a command or data received from at least one of other components (e.g., a non-volatile memory) on a volatile memory, process the command or data, and store various data in the non-volatile memory.

The communication module 310 may have the same or similar configuration to the communication module 112 of FIG. 1. The communication module 310 may include various communication circuitry, such as, for example, and without limitation, at least one of a Wi-Fi module, a bluetooth module, and a distress communication module. According to an example embodiment of the present disclosure, the communication module 310 may further include at least one of a BLE module, a zigbee module, a z-wave module, and a cellular module. Each of the Wi-Fi module, bluetooth module, distress communication module, and the cellular module may include a processor, e.g., for processing data transmitted or received through the module. According to an example embodiment of the present disclosure, at least some (e.g., two or more) of the Wi-Fi module, bluetooth module, distress communication module, and cellular module may be included in one integrated circuit (IC) or IC package. At least some of the Wi-Fi module, bluetooth module, distress communication module, and cellular module may share one RF module or each may have its own RF module.

The communication module 310 may further include, e.g., a distress communication module including circuitry that generates distress signals at a distress frequency, non-commercial frequency, or a predetermined frequency. The distress communication module is configured to generate a distress signal in response to sensing a search signal from the outside or a command from the processor 305 that responds to the user's manipulation. According to an example embodiment of the present disclosure, the distress communication module may be configured with a battery provided separately from those for other components or be configured to operate at a very low battery power level.

The memory 370 may include, e.g., an internal memory and/or external memory. The internal memory may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory may further include a flash drive, e.g., a compact flash (CF) memory, a secure digital (SD) memory, a micro-SD memory, a min-SD memory, an extreme digital (xD) memory, a multi-media card (MMC), or a memory stick™. The external memory may be functionally and/or physically connected with the electronic device 300 via various interfaces.

For example, the sensor module 340 may measure a physical quantity or detect a motion state of the electronic device 300, and the sensor module 240 may convert the measured or detected information into an electrical signal. The sensor module 340 may include at least one of, e.g., a gyro sensor, an air pressure sensor, an acceleration sensor, a proximity sensor (not shown), a color sensor (not shown), a biometric sensor, a temperature/humidity sensor, an illumination sensor (not shown), a UV sensor (not shown), a gas sensor (not shown), and a smoke sensor (not shown). The sensor module 340 may further include a control circuit for controlling at least one or more of the sensors included in the sensing module. According to an example embodiment of the present disclosure, the electronic device 300 may further include a processor configured to control the sensor module 340 as part of the processor 305 or separately from the processor 305, and the electronic device 300 may control the sensor module 340 while the processor 210 is in a sleep mode.

The input unit 320 may include various input circuitry, such as, for example, and without limitation, at least one of a touch panel and a key panel. The touch panel may use at least one of capacitive, resistive, infrared, or ultrasonic methods. The touch panel 252 may further include a control circuit. The touch panel may further include a tactile layer and may provide a user with a tactile reaction. The key panel may include e.g., a physical button, optical key or key pad.

The display 330 may include at least one of a panel, a hologram device, and a projector. The panel may be implemented to be flexible, transparent, or wearable. The panel and the touch panel of the input unit 320 may be configured in a single module. The hologram device may make three dimensional (3D) images (holograms) in the air by using light interference. The projector may display an image by projecting light onto a screen. The screen may be, for example, located inside or outside of the electronic device 300. In accordance with an embodiment, the display may further include a control circuit to control the panel, the hologram device, or the projector.

The audio module 360 may convert, e.g., a sound signal into an electrical signal and vice versa. At least a part of the audio module 360 may be included in e.g., the input/output interface 108 as illustrated in FIG. 1. The audio module 360 may process sound information input or output through e.g., a speaker or a microphone 288.

For example, the camera module 350 may be a device for recording still images and videos, and may include, according to an example embodiment of the present disclosure, one or more image sensors (e.g., front and back sensors), a lens, an Image signal processor (ISP), or a flash such as an LED or xenon lamp.

Each of the aforementioned components of the electronic device may include one or more parts, and a name of the part may vary with a type of the electronic device. The electronic device in accordance with various example embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware (e.g., circuitry), software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of processing circuitry, a dedicated processor, Application Specific Integrated Circuit (ASIC) chips, Field Programmable Gate Arrays (FPGAs), or Programmable Logic Arrays (PLAs) that perform some operations, which have already been known or will be developed in the future.

According to an example embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 102), may cause or enable the processor to carry out a corresponding function. The computer-readable storage medium may be e.g., the memory 104.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing devices and circuitry using an interpreter. The aforementioned hardware devices may be configured to operate as one or more software modules to carry out example embodiments of the present disclosure, and vice versa.

Figure 4:
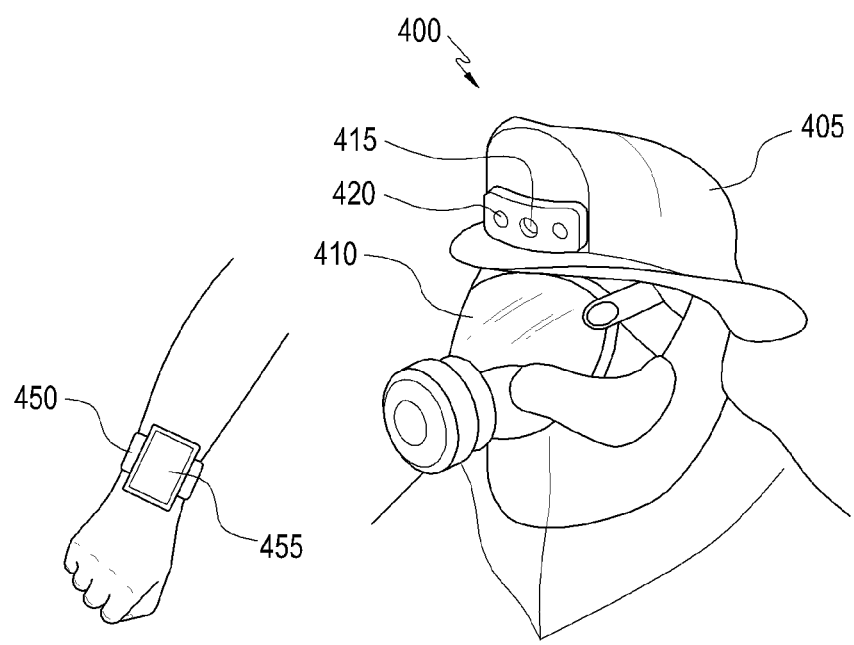
FIG. 4 is a perspective view illustrating an example of an electronic device according to an example embodiment of the present disclosure.

FIG. 4 is a perspective view illustrating an example of an electronic device according to an example embodiment of the present disclosure.

Referring to FIG. 4, the electronic device 100 of FIG. 1, as a wearable device carriable by the user or wearable on the user's body, may be, e.g., an HMD device 400 worn on the user's head. The HMD device 400 may be configured in the form of a helmet so that it may be fastened onto the user's head even when the user moves while he has difficulty using his hands, such as when he enjoys adventure, is rescuing or is rescued. As an example, the HMD device 400 may, for example, be a fire-retardant helmet used by a firefighter in a fire site. Further, the HMD device 400 may have an embedded display 410 or may interwork with a display 455 of an external device 450.

According to an example embodiment of the present disclosure, the HMD device 400 includes a housing 405 shaped as a helmet, a camera module 415 attached to the front of the housing 405, a sensor module 420, and a display 410 provided on a portion of the housing 405 or shaped as goggles. The goggles-shaped display 410 is positioned in front of the user's eyes and provides images from the HMD device 400 to the user.

According to an example embodiment of the present disclosure, the HMD device 400 may wirelessly, or by wire, interwork with a smart watch 450 to display images on the display 455 of the smart watch 450. The HMD device 400 may physically be coupled with an external display.

Figure 5:
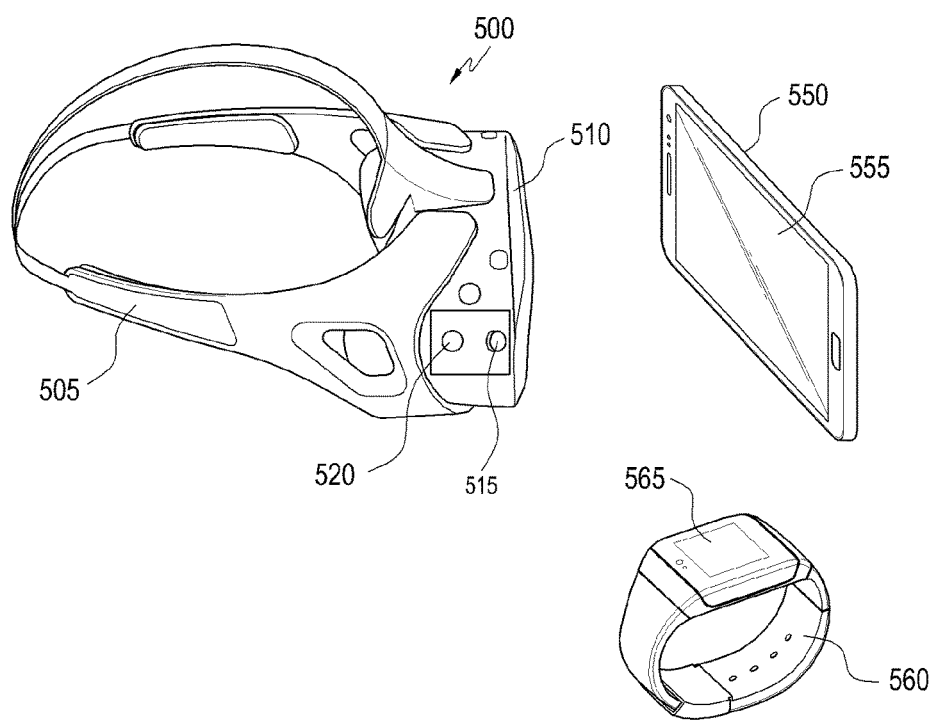
FIG. 5 is a perspective view illustrating another example of an electronic device according to an example embodiment of the present disclosure.

FIG. 5 is a perspective view illustrating another example of an electronic device according to an example embodiment of the present disclosure.

Referring to FIG. 5, the electronic device 100 of FIG. 1, as a device wearable on the user's body, may be, e.g., an HMD device 500 worn on the user's head. The HMD device 500 may be configured in the form of a hairband so that it may be fastened onto the user's head even when the user moves while he has difficulty using his hands, such as when he enjoys adventure, is rescuing or is rescued. Further, the HMD device 500 may have an embedded display 510 or may interwork with a display 555 of an external device 550.

According to an example embodiment of the present disclosure, the HIVID device 500 includes a housing 505 configured to be worn on the user's head, a camera module 515 attached to the front of the housing 505, a sensor module 520, and a display 510 that may be positioned at an area corresponding to the user's eyes. The display 510 is positioned in front of the user's eyes and provides images from the HMD device 500 to the user.

According to an example embodiment of the present disclosure, the HMD device 500 may wirelessly, or using a wire, interwork with a smartphone 550 or smart watch 560 to display images on the display 555/565 of the external device 550/560. Alternatively, the HMD device 500 may physically be coupled with the external display 555/565.

The electronic device 100, which may be configured as illustrated in FIG. 4 or 5, may be intended for users' safety in a distress site, e.g., a fire, or in industrial sites, such as a construction site, shipbuilding plant, or machinery plant. The user may use the electronic device 100 to rapidly determine the circumstance of the site or to notice information from the site.

As an example, a rescuer, e.g., a firefighter on the fire in building, may make use of distress information provided from the electronic device 100 to determine the location of rescuees in the building and move to the rescuees needing a quick rescue.

Figure 6:
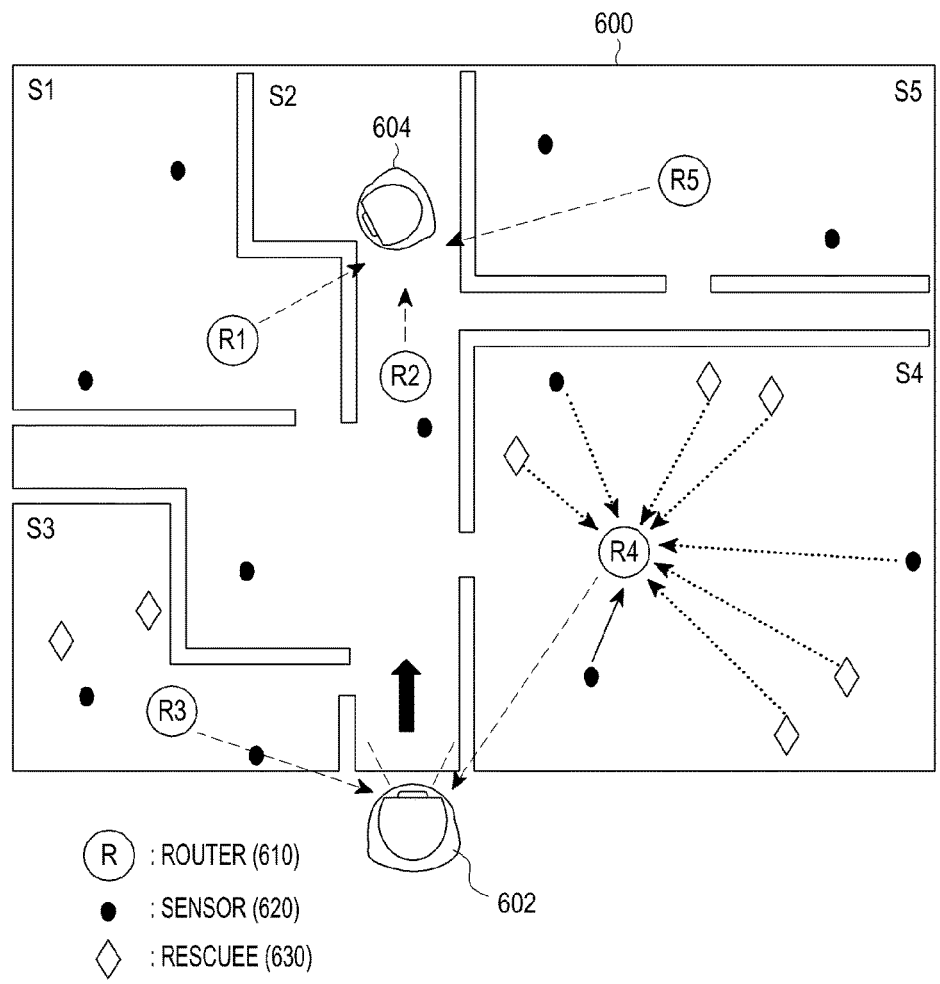
FIG. 6 is a diagram illustrating an example internal structure of a building in a distress site according to an example embodiment of the present disclosure.

FIG. 6 is a diagram illustrating an example internal structure of a building in a distress site according to an example embodiment of the present disclosure.

Referring to FIG. 6, a distress site 600 may be, e.g., a building on fire. Multiple sensors 620 are positioned inside the building to sense a dangerous situation, and a router (or a gateway) 610 is provided in each section separated physically or spatially to communicate with sensors 620 in a corresponding section. The router 610 may be, e.g., a wired/wireless Internet sharer capable of short-range communication such as Wi-Fi or bluetooth or a gateway connecting an internal network with an external network. Additionally, the router 610 may determine that rescuees carrying user devices are positioned nearby by sensing the user devices 630 located in sensable areas. For example, the user devices may also be referred to as rescuee's terminals.

According to an example embodiment of the present disclosure, the router 610 may periodically or aperiodically monitor the occurrence of distress signals or sensing data from the user devices 630 or sensors 620 pre-registered, sensable, or positioned around. According to an example embodiment of the present disclosure, the router 610 may start to monitor (or scan) the occurrence of sensing data and distress signals upon sensing a distress mode or receiving an indication of a distress mode from a management server. At least one of the sensing data and distress signals may be transmitted at a predetermined rescue frequency or a non-commercial frequency or through a predetermined communication scheme such as Wi-Fi or Bluetooth.

Rescuers, e.g., firefighters, may put on their respective terminals 602 and 604, each of which may be configured as the electronic device 400 or 500 of FIG. 4 or 5 and enter the distress site 600.

The sensors 620 may be configured to sense temperature, humidity, or harmful substances such as toxic gases or smoke and may be configured to periodically deliver or broadcast sensing data to the router 610. According to an example embodiment of the present disclosure, the sensors 620 may enter a distress mode by receiving a distress alert signal from at least one of the router 610, the rescuer's terminal 602 or 604, management server, and other entity and may start periodically broadcasting sensing data in the distress mode.

The rescuees' terminals 630 may be configured to generate distress signals in response to sensing a search signal or distress mode alert signal from the outside, a command generated by the processor 210 as per the user's manipulation, or initiating a distress mode as per a determination by the processor 210. As an example, the rescuees' terminals 630 may receive distress alert signals from a cellular communication network base station. For example, the base station may identify terminals positioned within the cell, which is its service coverage, receive a message indicating that a distress occurs in the cell from a higher network entity, and send the distress alert signals to terminals located at corresponding positions or all the terminals in the cell. According to an example embodiment of the present disclosure, the rescuees' terminals 630 may receive distress alert signals from an access point (AP) in charge of Wi-Fi communication and start to send distress signals.

Routers R1, R2, R3, R4, and R5 may gather sensing data broadcast from the sensors located within their respective sensing areas. Further, the routers may collect distress signals broadcast from the rescuees' terminals located within their sensing areas. As an example, the router R1 positioned in area S1 collects sensing data related to harmful materials sensed by two sensors positioned in area S1, e.g., at least one of a temperature measured, a humidity measured, a toxic gas concentration, and a heat/smoke value measured. The sensing data may be transmitted through wireless communication. e.g., Wi-Fi or bluetooth communication. Since no rescuee's terminal is present in area S1, the router R1 fails to sense a distress signal from a rescuee's terminal. As another example, the router R4 positioned in area S4 collects sensing sensed by three sensors positioned in area S4, e.g., at least one of a temperature measured and a gas concentration. Further, the router R4 may sense distress signals from rescuees' terminals 630 in area S4.

The routers may deliver the result of sensing sensing data and distress signals to the rescuers' terminals 602 and 604 as per a predetermined communication scheme periodically or in response to a request. As an example, the rescuer's terminal 602 may receive results of sensing distress signals and sensing data from the routers R3 and R4, and the rescuer's terminal 604 may receive results of sensing distress signals and sensing data from the routers R1, R2, and R5.

According to an example embodiment of the present disclosure, the rescuers' terminals 602 and 604 may directly receive sensing data and distress signals from rescuees' terminals and sensors positioned nearby, not through the routers. At least one of the distress signals and sensing data may be transmitted through bluetooth or at a dedicated frequency.

The rescuers' terminals 602 and 604 may determine an area that they will first search based on the sensing data and distress signal received directly or via the routers and generate search information that is to be shown to the user. As an example, the rescuers' terminals 602 and 604 determine the location of the rescuees' terminals based on the gathered data and identify a location where there are many rescuees, a location where a quick rescue is required, and a location that is easy accessible. To that end, the rescuers' terminals 602 and 604 determine the respective rescue priorities of areas in the building based on the number of rescuees and sensing data and generate search information (including at least one of, e.g., the number and location of rescuees, temperature, presence or absence of a toxic gas, and a directional indicator of the location of rescue) related to the location where a rescue will proceed. The search information generated is output through a display included in the rescuer's terminal 602 or 604 or interworking with the rescuer's terminal 602 or 604.

Figure 7:
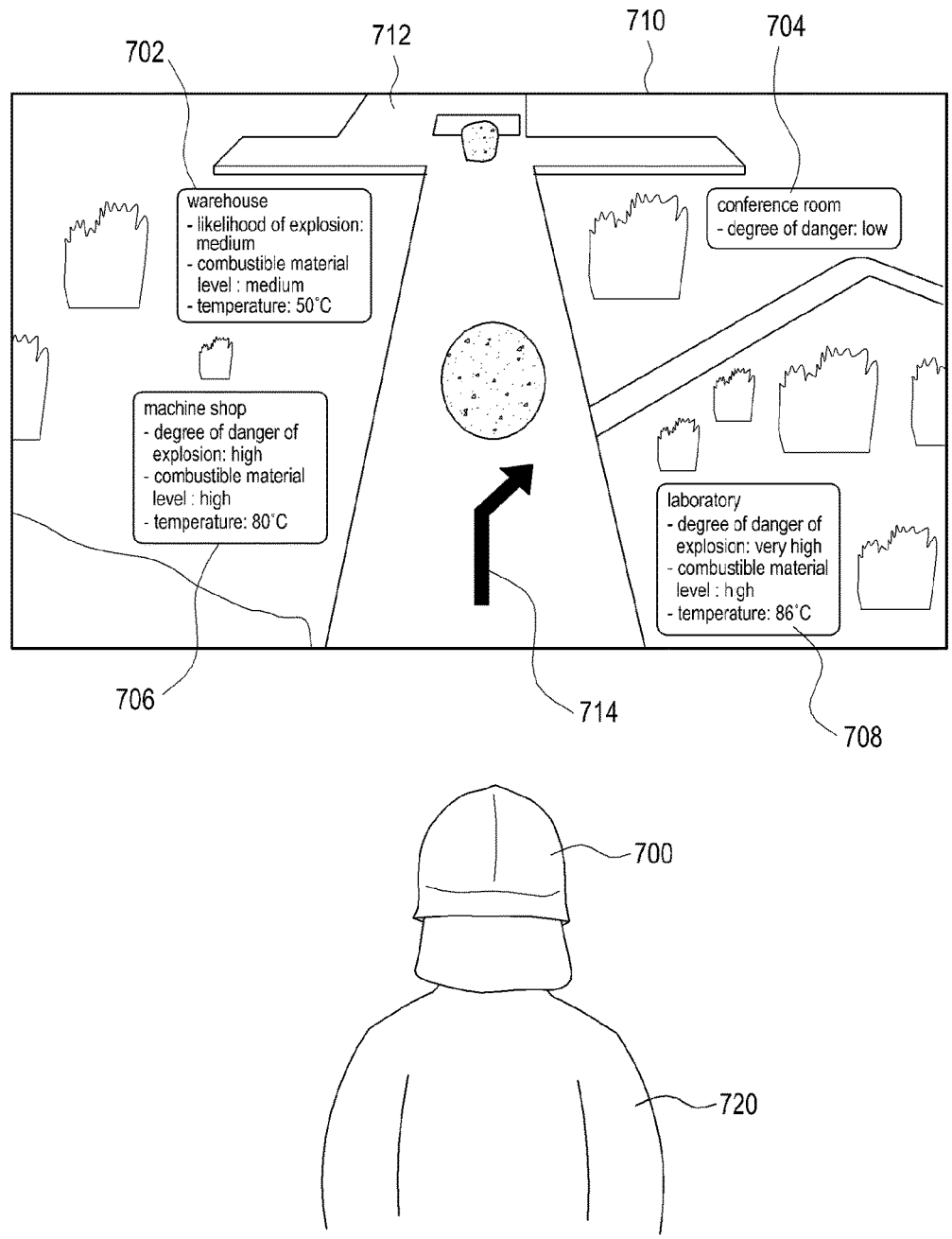
FIG. 7 is a diagram illustrating an example display screen for search information according to an example embodiment of the present disclosure.

FIG. 7 is a diagram illustrating an example display screen for search information according to an example embodiment of the present disclosure.

Referring to FIG. 7, the rescuer 720 may put a terminal 700 on his head. Further, the rescuer's terminal 700 may interwork with a display 710 positioned close to the rescuer's eyes or carriable by the rescuer 720, and the rescuer 720 may view images displayed on the display 710.

The display 710 outputs search information containing contents necessary for the rescuer to search a distress site. An example of the search information includes information 702, 704, 706, and 708 regarding each area rescued, together with guide information 712 for an area where he is to enter. According to an embodiment of the present disclosure, the guide information 712 may be an image of an aisle, wall, or room of a building, as the distress site, based on the position of the rescuer 720. According to an example embodiment of the present disclosure, the guide information may, for example, be at least a portion of a plan view of the building, as the distress site.

The information 702, 704, 706, and 708 regarding each area may be placed on a portion on the display 710 which corresponds to the direction and distance where the area is actually positioned with respect to the position of the rescuer 720. According to an example embodiment of the present disclosure, the information 702, 704, 706, and 708 regarding each area may be displayed in a larger size as the area is positioned closer to the rescuer 720 or needs a quicker rescue. According to an example embodiment of the present disclosure, the information 702, 704, 706, and 708 regarding each area may be displayed in different colors depending on distances or rescue priorities. According to an example embodiment of the present disclosure, an area required to be first rescued may display a red alert lamp that flickers.

Further, based on per-area priorities, the search information may be displayed in red for a higher-priority area and in blue for a lower-priority area.

The information 702, 704, 706, and 708 regarding each area may include at least one of the name, degree of danger, and type of danger (e.g., temperature, gas concentration, or smoke) of the area.

In the example illustrated, the information 702 about the first area includes "warehouse/likelihood of explosion: medium/combustible material level: medium/temperature: 50° C.," the information 704 about the second area includes "conference room/degree of danger: low," the information 706 about the third area includes "machine shop/degree of danger of explosion: high/combustible material level: high/temperature: 80° C.," and the information 708 about the fourth area includes "laboratory/degree of danger of explosion: very high/combustible material level: very high/temperature: 86° C."

According to an example embodiment of the present disclosure, the display 710 may display an image indicating the type of danger in a corresponding area, e.g., a fire image or gas image, along with the information 702, 704, 706, and 708 regarding each area. According to an example embodiment of the present disclosure, the search information displayed on the display 710 may further display an arrow 714 indicating the direction along which the rescuer 720 is to enter from his current position, and the arrow 714 may be included and displayed in the guide information 712.

According to an example embodiment of the present disclosure, when image information as captured by a rescuee's terminal is transferred from the rescuee's terminal to the rescuer's terminal 700, the rescuer's terminal 700 may display reconfigured image information corresponding to the target area of rescue, together with the search information about the area.

Figure 8:
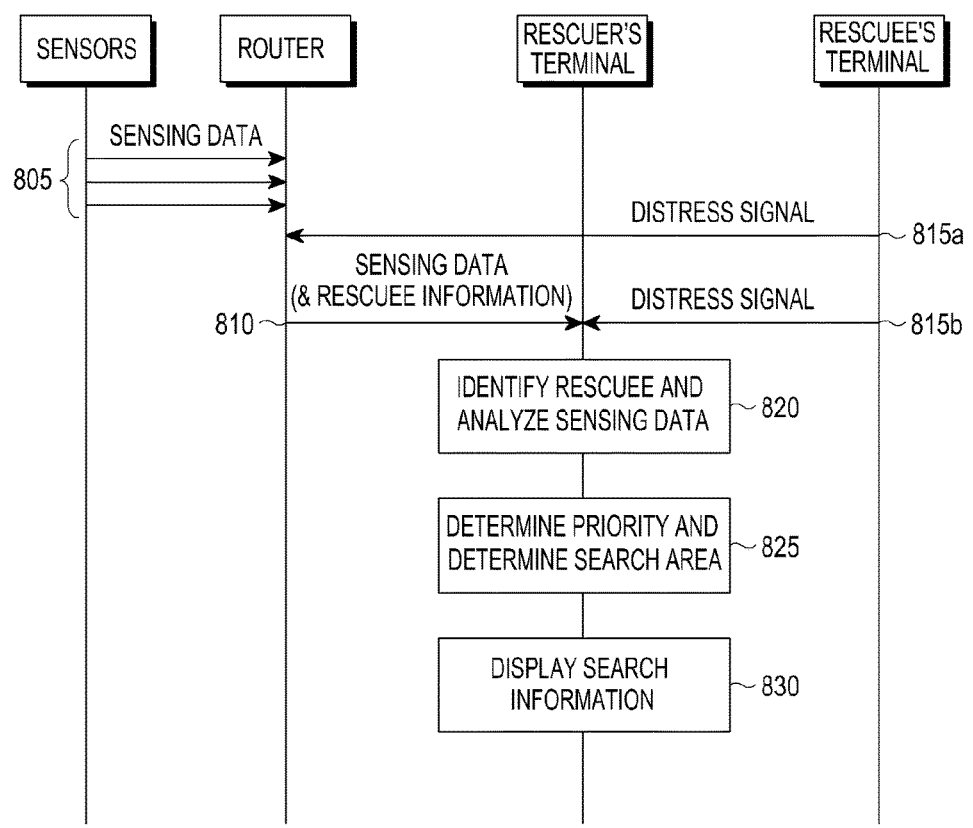
FIG. 8 is a flowchart illustrating an example process for providing search information by a rescuer's terminal according to an example embodiment of the present disclosure.

FIG. 8 is a flowchart illustrating an example process for providing search information by a rescuer's terminal according to an example embodiment of the present disclosure.

Referring to FIG. 8, sensors in a distress site may broadcast their own sensing data in operation 805, and a rescuee's terminal may broadcast distress signals in operation 815*a*. A router may sense the sensing data and a distress signal. According to an example embodiment of the present disclosure, the sensing data may include at least one of identification information regarding each sensor, a sensor type, location information, and a value sensed (including at least one of, e.g., a temperature measured, a humidity measured, a gas concentration, and a heat/smoke value sensed). According to an example embodiment of the present disclosure, the distress signal may include at least one of the identification information and location information regarding the rescuee's terminal. According to an example embodiment of the present disclosure, the distress signal may include no information about the rescuee's terminal. The router may determine the presence of at least one rescuee's terminal in an area sensable by sensing the distress signal. According to an example embodiment of the present disclosure, the distress signal may further include at least one of bio information, sensing data, and image information gathered by the rescuee's terminal.

In operation 810, a rescuer's terminal receives the sensing data and/or rescuee information transferred from the router. According to an example embodiment of the present disclosure, the rescuee information may include information about a distress signal, indicate the presence or absence of a rescuee's terminal, or include the number of rescuees' terminals from which distress signals are sensed. According to an example embodiment of the present disclosure, the rescuee information may include at least one of the number of rescuees, identification information, location information, bio information, sensing data, and image information regarding the rescuees. Optionally, the rescuer's terminal may directly receive the distress signals broadcast from the rescuee's terminal and generate the rescuee information in operation 815*b*.

In operation 820, the rescuer's terminal identifies whether there is a rescuee based on the received data (at least one of the sensing data, rescuee information, and distress signal) and analyzes the sensing data. According to an example embodiment of the present disclosure, the rescuer's terminal may determine the distance to the rescuee's terminal that has send the distress signal based on the strength (power level) of the distress signal received. According to an example embodiment of the present disclosure, the rescuer's terminal may identify the direction where the rescuee's terminal is positioned based on the angle of arrival (AOA) of the distress signal.

In operation 825, the rescuer's terminal determines the respective rescue priorities of areas of rescue depending on the result of the analysis and determines at least one target area (hereinafter, "search area") to be searched. The search area may refer, for example, to an area in distress that requires a rescue or an area requiring a measure or step for monitoring a harmful environment. The rescuer's terminal may determine the respective rescue priorities of areas or locations based on the sensing data. An example algorithm for determining the rescue priorities is described in greater detail below.

In operation 830, the rescuer's terminal generates search information about at least one search area determined and displays the search information. As an example, the search information may include at least one of guide information about the search area, the name, degree of danger, and type of danger (e.g., temperature, gas concentration, or smoke) of the area. According to an example embodiment of the present disclosure, the search information may include voice information guiding to the search area, and the rescuer's terminal may output the voice information through a speaker. The voice information may indicate the number/presence of rescuees, the location of rescue, direction of entry, degree of danger, and type of danger.

According to an example embodiment of the present disclosure, when the distress signal from the rescuee's terminal contains bio information, the rescuer's terminal may send a request signal to a server to request a necessary medical activity depending on the rescuee's bio information. For example, the request signal may include at least one of bio information about the rescuee and information about the necessary medical activity, and in response to the request signal, the server may notify a rescue team to get ready for an ambulance and/or first-aid treatment outside the distress site.

According to an example embodiment of the present disclosure, as per the search information, the rescuer's terminal may move where the rescuee's terminal is located and send a search signal or particular message that may be received by the rescuee's terminal. The rescuee's terminal may flicker a light emitting diode (LED) or give off a predetermined sound in response to the search signal or particular message, notifying the rescuee that the rescuer is nearby. Further, the rescuee's terminal may send at least one of image information, a rescue request message, and a distress signal to the rescuer's terminal in response to the search signal or particular message.

Figure 9:
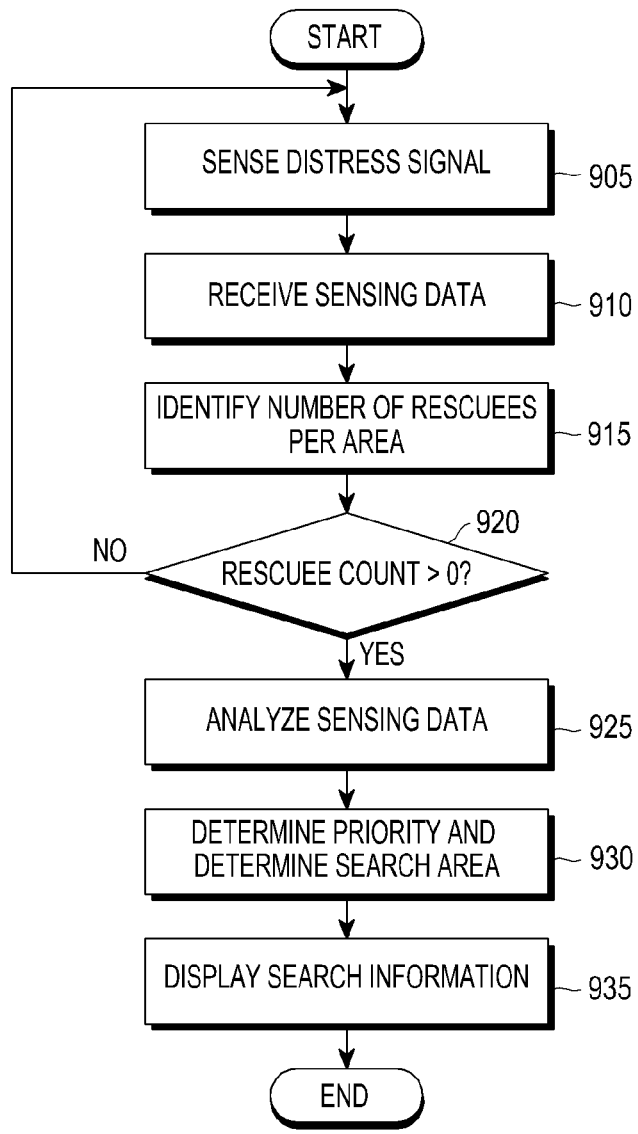
FIG. 9 is a flowchart illustrating example operations of a rescuer's terminal according to an example embodiment of the present disclosure.

FIG. 9 is a flowchart illustrating example operations of a rescuer's terminal according to an embodiment of the present disclosure.

Referring to FIG. 9, a rescuer's terminal receives a distress signal from a rescuee's terminal directly or through a router in operation 905. According to an example embodiment of the present disclosure, the distress signal may include at least one of identification information, location information, and bio information regarding the rescuee's terminal. According to an example embodiment of the present disclosure, the rescuer's terminal may receive rescuee information including identification information regarding at least one rescuee's terminal or the number of distress signals sensed. In operation 910, the rescuer's terminal receives sensing data from sensors in the distress site directly or via the router. According to an example embodiment of the present disclosure, the sensing data may include at least one of identification information regarding each sensor, a sensor type, location information, and a value sensed (including at least one of, e.g., a temperature measured, a humidity measured, a gas concentration, and a heat/smoke value sensed).

In operation 915, the rescuer's terminal identifies the number of rescuees per area of the distress site. As an example, each area may refer, for example, to an area where one router is assigned. As another example, each area may be a room physically separated from another. For example, the rescuer's terminal may determine the number of rescuees positioned in the area of a particular router depending on the number of distress signals relayed by the router. By way of example, the rescuer's terminal may determine the number of rescuees in a particular area (e.g., a room or floor) based on the location of the rescuee's terminal obtained from the distress signal.

In operation 920, the rescuer's terminal determines whether the number of rescuees in each area is 0, and until the number of rescuees is 0 in all of the areas, goes back to operation 905. When the rescuee count in a particular area is 0, the rescuer's terminal proceeds with operation 925.

In operation 925, the rescuer's terminal analyzes sensing data related to the area. According to an example embodiment of the present disclosure, the sensing data may be sensing data delivered from the router of the area. Alternatively, the sensing data may be sensing data gathered fro sensors positioned inside the area or positioned nearby the area.

In operation 930, the rescuer's terminal determines the rescue priority of the area based on the result of analysis of the sensing data and determines a search area based on the respective rescue priorities of a plurality of areas.

In operation 935, the rescuer's terminal generates search information about the determined search area and provides (displays or outputs) the search information to the user. The search information may include at least one of, e.g., the number and location of rescuees, temperature, presence or absence/amount of dangerous material, presence or absence/concentration of toxic gas, and directional indicator of the location of rescue.

Table 1 below represents an example of data gathered per area by the rescuer's terminal.

TABLE 1

|  |  | S1 | S2 | S3 |
|---|---|---|---|---|
| sensor | temperature sensor | 30° C. | 36° C. | 58° C. |

TABLE 1-continued

|  | S1 | S2 | S3 |
| --- | --- | --- | --- |
| gas concentration sensor | $O_2$, 25% CO, 200 ppm $H_2S$, 20 ppm | $O_2$, 22.5% CO, 350 ppm $H_2S$, 20 ppm | $O_2$, 18% CO, 400 ppm $H_2S$, 100 ppm |
| humidity sensor | — | — | 53.5% |
| rescuee count | 0 | 2 | 5 |

An example of an algorithm for determining a search area based on sensing data and rescuee information is described below.

The rescuer's terminal may have a mapping table that maps a rescue difficulty/degree of danger to each sensor. Tables 2 and 3 below represent mapping tables for a temperature sensor and gas concentration sensor, respectively.

TABLE 2

| temperature range | rescue difficulty | value |
| --- | --- | --- |
| less than 35° C. | easy to extinguish | 5 |
| 35° C. to 50° C. | extinguishable/use caution | 4 |
| 50° C. to 60° C. | degree of danger: medium | 2 |
| 60° C. to 80° C. | degree of danger: high | 1 |
| more than 80° C. | inextinguishable | 0 |

TABLE 3

| $O_2$ concentration | rescue difficulty | value |
| --- | --- | --- |
| in excess of 23.5% vol | easy to extinguish | 5 |
| 23.5% vol to 21.5% vol | degree of danger: medium | 3 |
| 215% vol to 19.5% vol | degree of danger: medium high | 2 |
| less than 19.5% vol | degree of danger: high | 1 |

Likewise, mapping tables similar to Table 2 above may also be provided for other gases, e.g., CO, $O_2$, $NH_3$, $Cl_2$, HCN, NO, and $SO_2$.

The rescuer's terminal determines the rescue priorities given, e.g., the number of rescuees and weights previously assigned to the sensing data, which are parameters taken into consideration.

As an example, a weight for the rescuee count may be 0.5, a weight for the toxic gas concentration may be 0.3, and a weight for temperature may be 0.2. As another example, a weight for the rescuee count may be 0.7, and a weight for temperature 0.3.

The respective example rescue priorities of the areas as computed by applying the weights assignable as above are shown in Table 4 below:

TABLE 4

|  |  | S1 | S2 | S3 |
| --- | --- | --- | --- | --- |
| sensor | temperature sensor | 30° C. | 36° C. | 58° C. |
|  | gas | $O_2$, 25% | $O_2$, 22.5% | $O_2$, |

TABLE 4-continued

|  |  | S1 | S2 | S3 |
| --- | --- | --- | --- | --- |
|  | concentration sensor | CO, 200 ppm $H_2S$, 20 ppm | CO, 350 ppm $H_2S$, 20 ppm | 18% CO, 400 ppm $H_2S$, 100 ppm |
|  | humidity sensor | — | — | 53.5% |
|  | rescuee count | 0 | 2 | 5 |
|  | priority | 3.0 | 3.5 | 7.2 |
|  | priority | 3 | 2 | 1 |

As an example, a priority for area S1 may be computed as follows:

rescuee count(0)*weight(0.5)+toxi gas concentration (5)*weight(0.3)+temperature(5)*weight(0.2)=3.0

Similarly, priorities obtained by applying the mapping values of $O_2$ and other toxi gases Co and $H_2S$ to S2 and S3 are computed as 3.5 and 7.2, respectively.

Then, the rescuer's terminal determines that the priority for area S3 is highest and that the priority for area S2 is lower than the priority for area S3, and the priority for area S1 is lower than the priority for area S2. In this example, the respective priorities for area S3, S2, and S1 may be represented as 1, 2, and 3, respectively. According to an example embodiment of the present disclosure, when a particular area is accompanied with a restriction, its priority may be determined to be, e.g., 0, meaning a 'keep out'.

Given the priorities determined above, area S3 requires a quickest rescue. Accordingly, the rescuer's terminal first displays search information regarding area S3. According to an example embodiment of the present disclosure, the rescuer's terminal may display search information about one or more higher-rescue priority areas, e.g., areas S3 and S2.

The weights and the equation for determining the rescue priorities set forth above are merely an example, and the present disclosure is not limited thereto.

Figure 10:
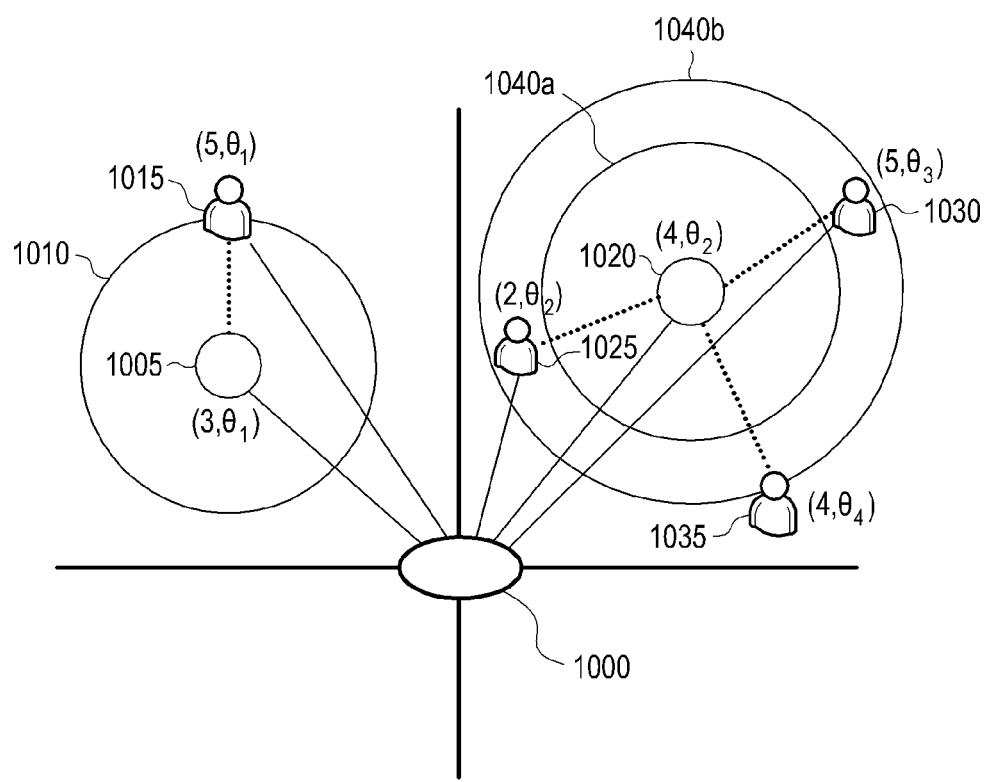
FIG. 10 is a diagram illustrating an example operation of determining the number of rescuees according to an example embodiment of the present disclosure.

FIG. 10 is a diagram illustrating an example operation of determining the number of rescuees according to an example embodiment of the present disclosure.

Referring to FIG. 10, a rescuer's terminal 1000 may receive location information regarding each router from routers 1005 and 1020 or previously receive the location information from a server. Location information regarding the router 1005 may be (3, $\theta_1$), where 3 is a distance, and $\theta_1$ is a directional angle, and location information regarding the router 1020 may be (4, $\theta_2$).

The rescuer's terminal 1000 may receive location information regarding a rescuee's terminal 1015 positioned within a sensing area 1010 of the router 1005 from the router 1005. The location information regarding the rescuee's terminal 1015 may include a distance and direction with respect to the router 1005. Then, the rescuer's terminal 1000 may determine location information (5, $\theta_1$) including the distance and direction of the rescuee's terminal 1015 with respect to the rescuer's terminal 1000, based on the location information regarding the router 1005 and the location information regarding the rescuee's terminal 1015 that is delivered through the router 1005.

Likewise, the rescuer's terminal 1000 may receive location information regarding rescuees' terminals 1025 and 1030 positioned within a first tier sensing area 1040a of the router 1020 from the router 1020. Further, the rescuer's terminal 1000 may receive location information regarding a rescuee's terminal 1035 positioned within a second tier sensing area 1040*b* of the router 1020. The location information regarding the rescuees' terminals 1025, 1030, and 1035 may include a distance and direction with respect to the router 1020. Then, the rescuer's terminal 1000 may determine location information $(2, \theta_2)$, $(5, \theta_3)$, and $(4, \theta_4)$ including the distances and directions of the rescuees' terminals 1025, 1030, and 1035 with respect to the rescuer's terminal 1000, based on the location information regarding the router 1020 and the location information regarding the rescuees' terminals 1025, 1030, and 1035 that is delivered through the router 1020.

Then, the rescuer's terminal 1000 may choose at least one rescuee's terminal that it will first approach based on the location information regarding the rescuees' terminals 1025, 1030, and 1035 computed or display the locations of the rescuees' terminals 1025, 1030, and 1035, along with the search information.

Figure 11:
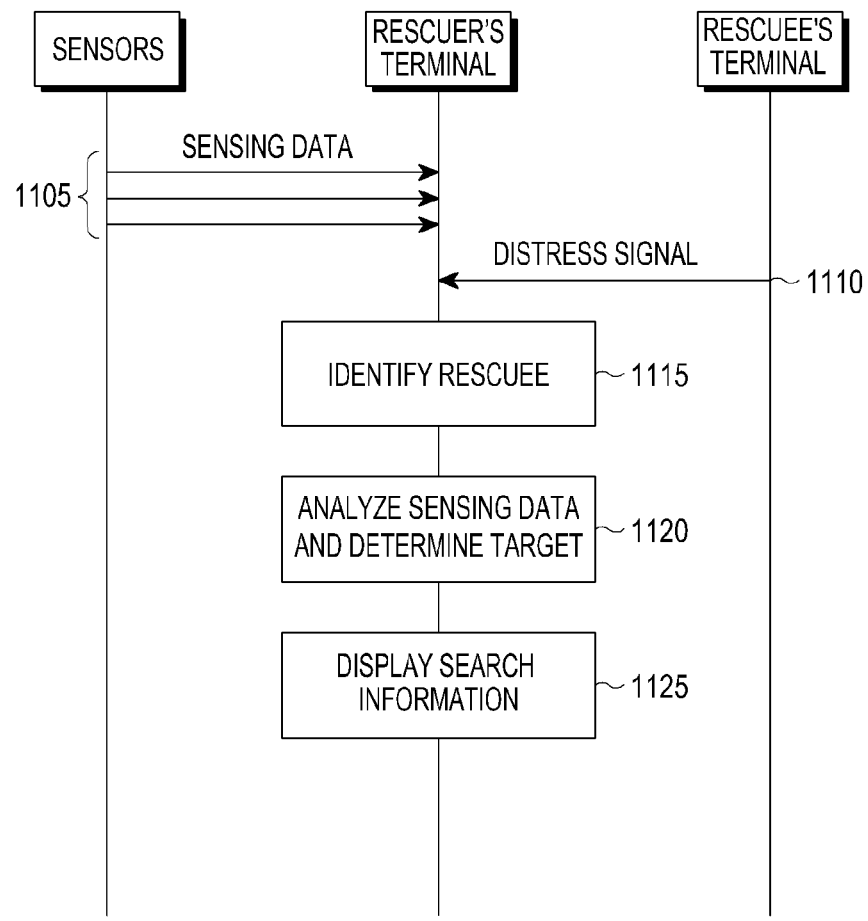
FIG. 11 is a flowchart illustrating an example process for providing search information according to an example embodiment of the present disclosure.

FIG. 11 is a flowchart illustrating an example process for providing search information according to an example embodiment of the present disclosure.

Referring to FIG. 11, sensors in a distress site may broadcast or transmit their own sensing data in operation 1105, and a rescuee's terminal may broadcast or transmit distress signals in operation 1110. The rescuer's terminal may sense the sensing data and a distress signal. According to an example embodiment of the present disclosure, the sensing data may include at least one of identification information regarding each sensor, a sensor type, location information, and a value sensed (including at least one of, e.g., a temperature measured, a humidity measured, a gas concentration, and a heat/smoke value sensed). According to an example embodiment of the present disclosure, the distress signal may include at least one of the identification information and location information regarding the rescuee's terminal. According to an example embodiment of the present disclosure, the distress signal may include no information about the rescuee's terminal. The router may determine the presence of at least one rescuee's terminal in an area sensable by sensing the distress signal. According to an example embodiment of the present disclosure, the distress signal may further include at least one of bio information, sensing data, and image information gathered by the rescuee's terminal.

In operation 1115, the rescuer's terminal identifies whether there is a rescuee's terminal based on the distress signal. According to an example embodiment of the present disclosure, the rescuer's terminal may determine the distance to the rescuee's terminal that has send the distress signal based on the strength (power level) of the distress signal received. According to an example embodiment of the present disclosure, the rescuer's terminal may identify the direction where the rescuee's terminal is positioned based on the angle of arrival (AOA) of the distress signal.

In operation 1120, the rescuer's terminal analyzes the sensing data and determines a target location of rescue based on the result of analysis. When the rescuer's terminal previously determines information about a plan or layout of the distress site, the target location may be a particular area (e.g., a space or room where a particular router is located) in the distress site. When the rescuer's terminal is unaware of the layout of the distress site, the target location may be a particular geographical location (e.g., a longitude, latitude, or altitude). The target location of rescue may be determined based on the location of the rescuee's terminal as obtained from the distress signal and the location of sensors as obtained from the sensing data.

In operation 1125, the rescuer's terminal generates search information about the determined target location and displays the search information. As an example, the search information may include at least one of guide information about the target location or the search area, the name, degree of danger, and type of danger (e.g., temperature, gas concentration, or smoke) of the area.

Figure 12:
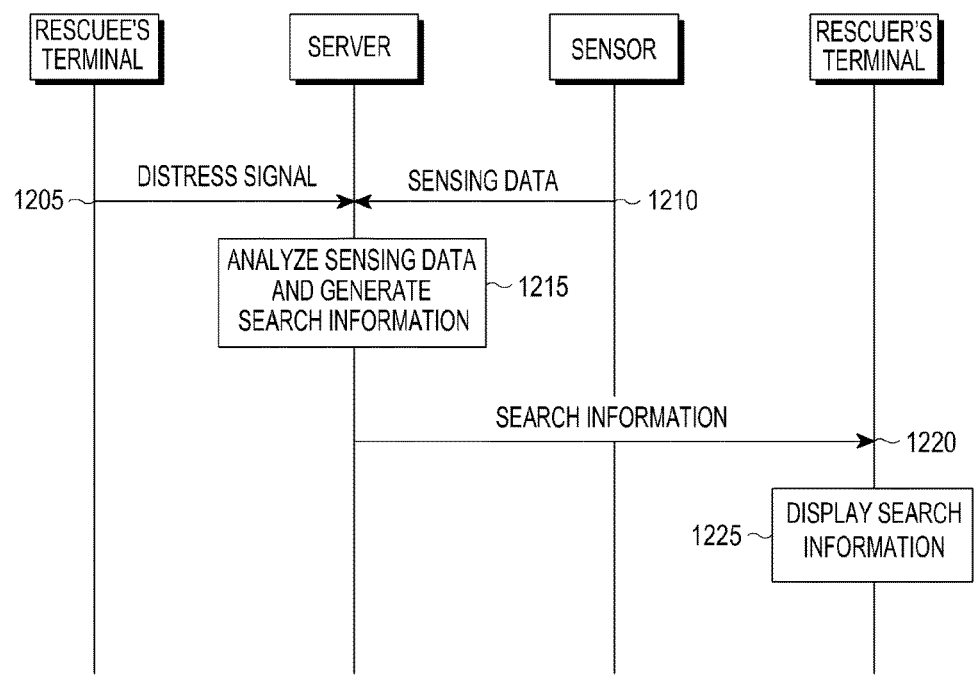
FIG. 12 is a flowchart illustrating an example process for determining search information by a server according to an example embodiment of the present disclosure.

FIG. 12 is a flowchart illustrating an example process for determining search information by a server according to an example embodiment of the present disclosure.

Referring to FIG. 12, a rescuee's terminal may broadcast or transmit distress signals in operation 1205, and sensors may broadcast or transmit sensing data in operation 1210. A server which may be a rescue server or a management server in the building, may sense the sensing data and distress signal. Although not shown, the sensing data and distress signal may be delivered by at least one router to the server. As an example, the management server in the building, as the distress site, may be wiredly or wirelessly connected with routers in the building and may receive sensing data and distress signal gathered by each router. For example, the rescue server may be implemented in a rescue team's vehicle that may move to the distress site and receive the sensing data and distress signal, gathered by the building management server, from the management server.

According to an example embodiment of the present disclosure, the sensing data may include at least one of identification information regarding each sensor, a sensor type, location information, and a value sensed (including at least one of, e.g., a temperature measured, a humidity measured, a gas concentration, and a heat/smoke value sensed). According to an example embodiment of the present disclosure, the distress signal may include at least one of the identification information and location information regarding the rescuee's terminal. According to an example embodiment of the present disclosure, the distress signal may include no information about the rescuee's terminal. The router may determine the presence of at least one rescuee's terminal in an area sensable by sensing the distress signal. According to an example embodiment of the present disclosure, the distress signal may further include at least one of bio information, sensing data, and image information gathered by the rescuee's terminal.

In operation 1215, the server identifies the presence or absence of a rescuee based on the distress signal, analyzes the sensing data, and generates search information about a search area or target location of rescue based on the result of analysis. When the server has information about a plan or layout of the distress site, the target location may be a particular area (e.g., a space or room where a particular router is located) in the distress site. When the server is unaware of the layout of the distress site, the target location may be a particular geographical location (e.g., a longitude, latitude, or altitude). The target location of rescue may be determined based on the location of the rescuee's terminal as obtained from the distress signal and the location of sensors as obtained from the sensing data.

According to an example embodiment of the present disclosure, a management server in a particular building, e.g., a hotel or office building, may retain accommodation information based on the ingress/egress of guests or staff and may determine a rescuee count further given the accommodation information. Here, the accommodation information may indicate whether a guest or staff are present in a room or building or include identification information or the number of guests or staff in the room or building. As an example, when a hotel guest puts a smart key on a reader provided at a particular place (e.g., a room door or elevator) to enter a room, accommodation information regarding the guest may be delivered and stored in a hotel management server. Likewise, when an office building worker puts a smart key on a reader provided at a particular place (e.g., a building gate or entrance on each floor) to enter or exit the building, accommodation information regarding the worker may be delivered and stored in a building management server. The management server may determine a rescuee count per area (e.g., per room or per floor) based on the accommodation information and use the computed rescuee count to generate the search information.

In operation 1220, the server provides the search information to the rescuer's terminal. As an example, the search information may include at least one of guide information about the search area, the name, degree of danger, and type of danger (e.g., temperature, gas concentration, or smoke) of the area. In operation 1225, the rescuer's terminal displays the search information.

Figure 13:
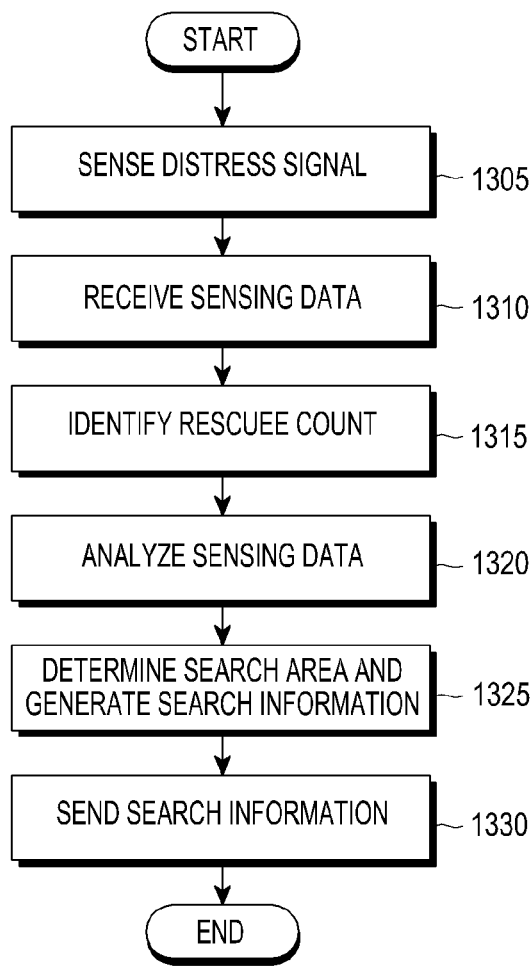
FIG. 13 is a flowchart illustrating example operations of a server according to an example embodiment of the present disclosure.

FIG. 13 is a flowchart illustrating example operations of a server according to an example embodiment of the present disclosure.

Referring to FIG. 13, the server gathers distress signals from rescuees' terminals in operation 1305, and the server gathers sensing data from sensors in operation 1310. For example, the sensing data and distress signals may be transferred to the server through at least one of at least one router, management server, and rescuer's terminal.

In operation 1315, the server identifies a rescuee count based on the distress signals. In operation 1320, the server analyzes sensing data related to a location (or an area) where the number of rescuees is not 0. According to an example embodiment of the present disclosure, the server may additionally use accommodation information regarding hotel guests or office staff to identify the rescuee count.

In operation 1325, the server generates search information about a target location (or a search area) of rescue based on the result of analysis. In operation 1330, the server provides the search information to the rescuer's terminal. For instance, the search information may be transmitted from the server to the rescuer's terminal using at least one of Wi-Fi, bluetooth, dedicated frequency, or cellular communication.

Figure 14:
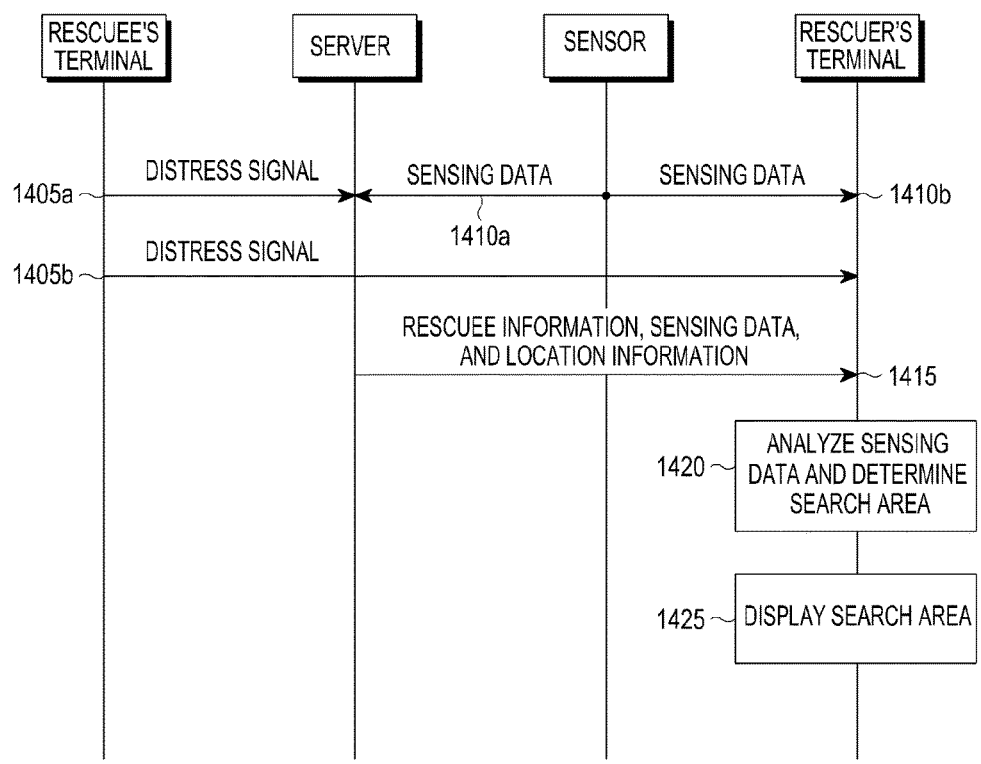
FIG. 14 is a flowchart illustrating an example process for providing search information through support by a server according to an example embodiment of the present disclosure.

FIG. 14 is a flowchart illustrating an example process for providing search information through support by a server according to an example embodiment of the present disclosure.

Referring to FIG. 14, a rescuee's terminal may broadcast or transmit distress signals in operations 1405a and 1405b, and sensors may broadcast or transmit sensing data in operation 1410a and 1410b. A server which may be a rescue server or a management server in the distress site, may sense the sensing data and distress signal. Although not shown, as an example, the sensing data and distress signal may be delivered by at least one router and/or management server to the server.

In operation 1415, the server transfers the gathered distress signal and sensing data to the rescuer's terminal. According to an example embodiment of the present disclosure, the server may transfer rescuee information generated based on the gathered distress signal, instead of the distress signal, to the rescuer's terminal. According to an example embodiment of the present disclosure, the server may generate the rescuee information further considering accommodation information regarding a hotel guest or office worker.

The rescuer's terminal receives the rescuee information (or distress signal) and sensing data from the server. Further, the rescuer's terminal may directly receive the distress signal from the rescuee's terminal and sensing data from the sensors (or router) in operations 1405b and 1410b.

In operation 1420, the rescuer's terminal identifies the presence or absence of a rescuee based on the rescuee information, analyzes the sensing data, and determines a search area or target location of rescue based on the result of analysis. When the rescuer's terminal has information about a plan or layout of the distress site, the target location may be a particular area (e.g., a space or room where a particular router is located) in the distress site. When the rescuer's terminal is unaware of the structure or layout of the distress site, the target location may be a particular geographical location (e.g., a longitude, latitude, or altitude). The target location of rescue may be determined based on the location of the rescuee's terminal as obtained from the distress signal and the location of sensors as obtained from the sensing data.

In operation 1425, the rescuer's terminal generates search information about the determined target location or search area and displays the search information. As an example, the search information may include at least one of guide information about the search area, the name, degree of danger, and type of danger (e.g., temperature, gas concentration, or smoke) of the area.

Figure 15:
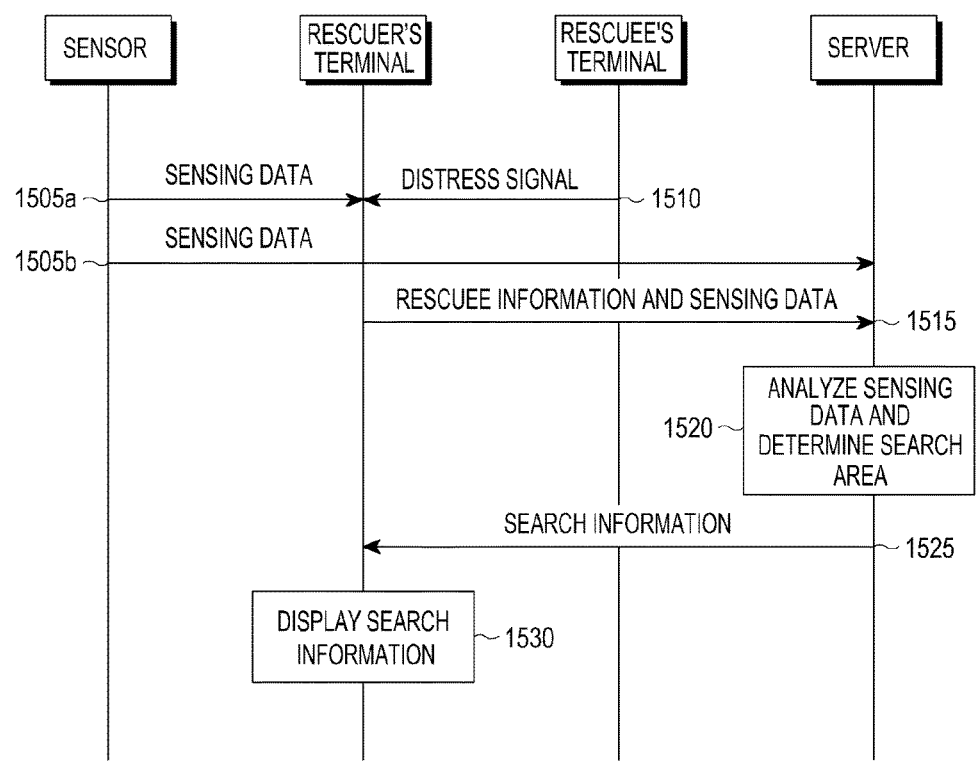
FIG. 15 is a flowchart illustrating an example process for displaying search information provided by a server according to an example embodiment of the present disclosure.

FIG. 15 is a flowchart illustrating an example process for displaying search information provided by a server according to an embodiment of the present disclosure.

Referring to FIG. 15, sensors may broadcast or transmit sensing data in operation 1505a and 1505b, and a rescuee's terminal may broadcast or transmit distress signals in operation 1510. The rescuer's terminal may sense the sensing data and a distress signal. Although not shown, as an example, the sensing data and distress signal may be delivered by at least one router and/or management server to the rescuer's terminal.

In operation 1515, the rescuer's terminal transfers the gathered sensing data and distress signal to a server that may be a management server in the distress site or a rescue team's server. According to an example embodiment of the present disclosure, the rescuer's terminal may transfer rescuee information generated based on the gathered distress signal, instead of the distress signal, to the server.

The server receives the rescuee information (or distress signal) and sensing data from the rescuer's terminal. Further, the server may receive the sensing data from the sensors directly or via the management server in operation 1505b.

In operation 1520, the server identifies the presence or absence of a rescuee based on the rescuee information, analyzes the sensing data, and determines a search area or target location of rescue based on the result of analysis. When the server has information about a plan or layout of the distress site, the target location may be a particular area (e.g., a space or room where a particular router is located) in the distress site. When the server is unaware of the structure or layout of the distress site, the target location may be a particular geographical location (e.g., a longitude, latitude, or altitude). The target location of rescue may be determined based on the location of the rescuee's terminal as obtained from the distress signal and the location of sensors as obtained from the sensing data. According to an example embodiment of the present disclosure, the server may determine the search area/target location of rescue further considering accommodation information regarding a hotel guest or office worker.

In operation 1525, the server generates search information about the determined target location or search area and transmits the search information to the rescuer's terminal. As an example, the search information may include at least one of guide information about the search area, the name, degree of danger, and type of danger (e.g., temperature, gas concentration, or smoke) of the area. In operation 1530, the rescuer's terminal displays the search information.

Figure 16:
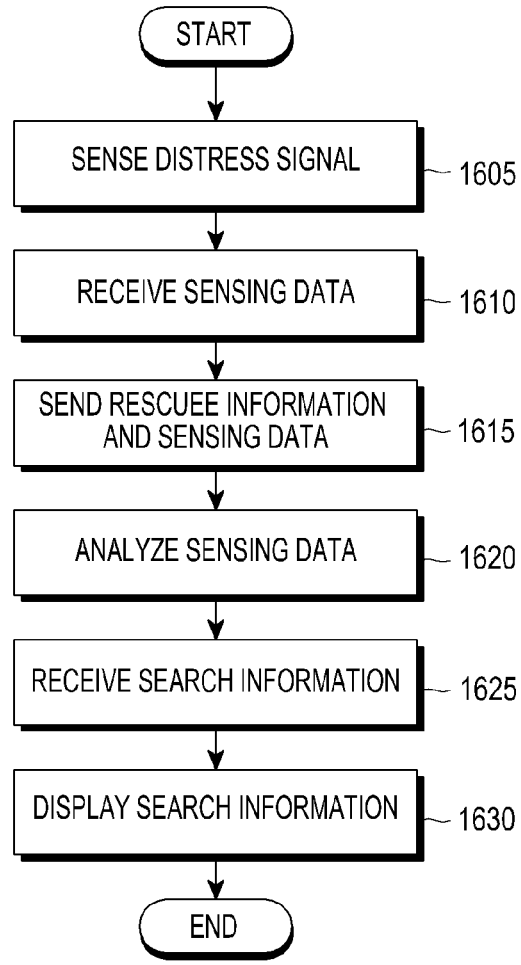
FIG. 16 is a flowchart illustrating example operations of a rescuer's terminal through support by a server according to an example embodiment of the present disclosure.

FIG. 16 is a flowchart illustrating example operations of a rescuer's terminal according to an embodiment of the present disclosure.

Referring to FIG. 16, the rescuer's terminal gathers distress signals from rescuees' terminals in operation 1605 and gathers sensing data from sensors in operation 1610. As an example, the sensing data and distress signals may be delivered by at least one router and management server to the rescuer's terminal.

In operation 1615, the rescuer's terminal transmits rescuee information generated based on the gathered sensing data and sensing data to the server. In operation 1620, the server analyzes the sensing data. In operation 1625, the rescuer's terminal receives search information about a target location (or search area) of rescue from the server. In operation 1630, the rescuer's terminal displays the search information. As an example, the search information may include at least one of guide information about the search area, the name, degree of danger, and type of danger (e.g., temperature, gas concentration, or smoke) of the area.

Figure 17:
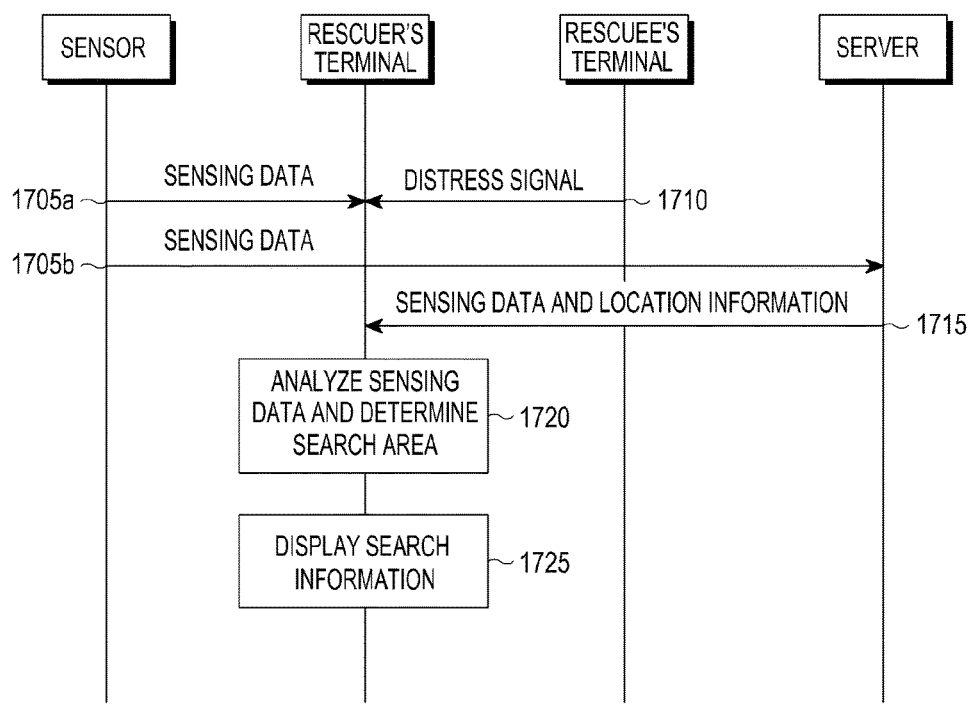
FIG. 17 is a flowchart illustrating an example process for providing search information through support by a server according to an example embodiment of the present disclosure.

FIG. 17 is a flowchart illustrating an example process for providing search information through support by a server according to an example embodiment of the present disclosure.

Referring to FIG. 17, sensors may broadcast or transmit sensing data in operation 1705a and 1705b, and a rescuee's terminal may broadcast or transmit distress signals in operation 1710. The rescuer's terminal may sense the sensing data and a distress signal. Although not shown, as an example, the sensing data and distress signal may be delivered by at least one router and/or management server to the rescuer's terminal.

In operation 1715, the server receives sensing data sensed by sensors in the distress site directly 1705b or via at least one router and/or management server and transmits location information about the sensors and the sensing data to the rescuer's terminal. According to an example embodiment of the present disclosure, the server may provide information about a plan or layout of the distress site to the rescuer's terminal. According to an example embodiment of the present disclosure, the server may provide accommodation information about a hotel guest or office worker to the rescuer's terminal.

In operation 1720, the rescuer's terminal identifies the presence or absence of a rescuee based on the accommodation information and distress signals gathered, analyzes the sensing data, and determines a search area or target location of rescue based on the result of analysis. When the rescuer's terminal has information about a plan or layout of the distress site, the target location may be a particular area (e.g., a space or room where a particular router is located) in the distress site. When the rescuer's terminal is unaware of the structure or layout of the distress site, the target location may be a particular geographical location (e.g., a longitude, latitude, or altitude). The target location of rescue may be determined based on the location of the rescuee's terminal as obtained from the distress signal and the location of sensors.

In operation 1725, the rescuer's terminal generates search information about the determined target location or search area and displays the search information. As an example, the search information may include at least one of guide information about the search area, the name, degree of danger, and type of danger (e.g., temperature, gas concentration, or smoke) of the area.

According to an example embodiment of the present disclosure, the server or rescuer's terminal may first consider a movement of the rescuee's terminal in determining the target location of rescue or search area. As an example, sensing a movement of the rescuee's terminal shows a higher chance of the rescuee being alive and recurable and is thus assigned priority in rescue.

Figure 18:
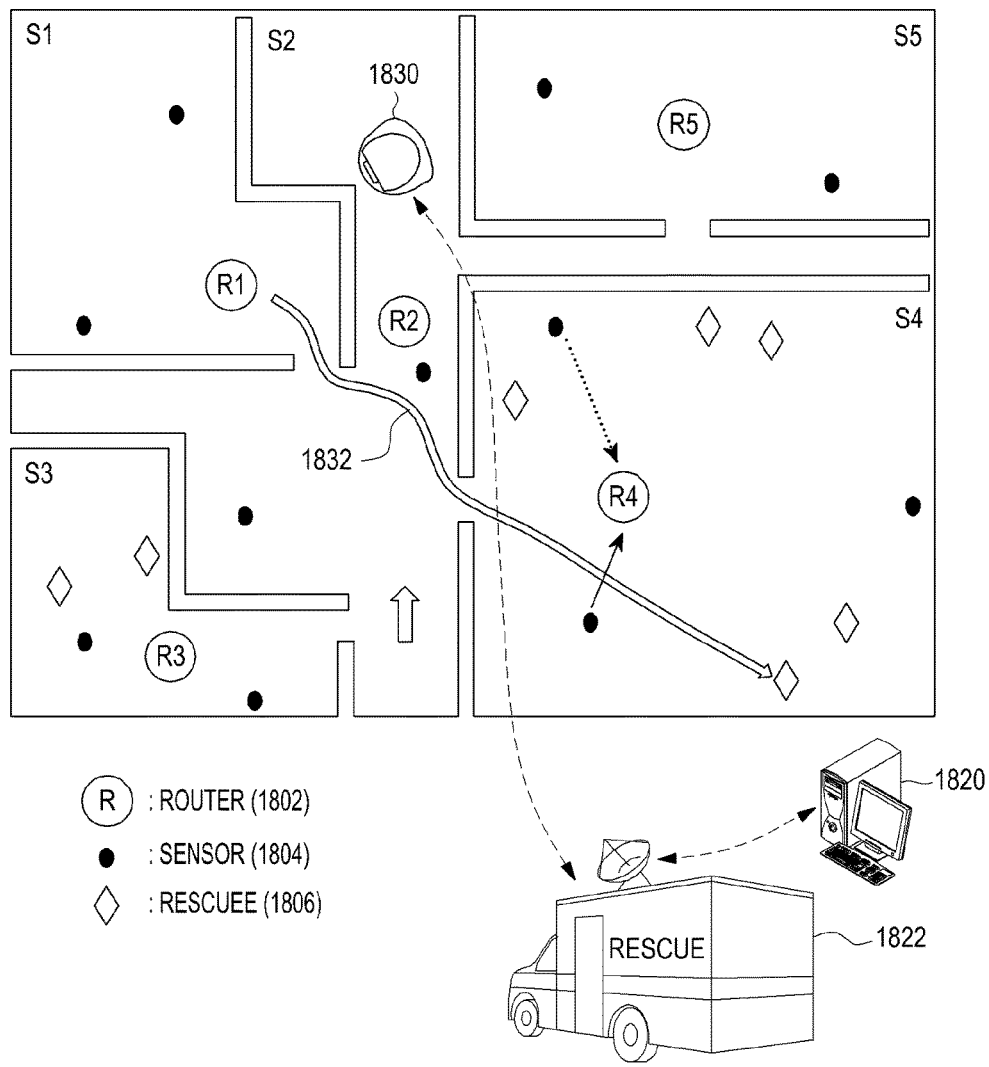
FIG. 18 is a diagram illustrating an example operation for sensing a movement of a rescuee's terminal according to an example embodiment of the present disclosure.

FIG. 18 is a diagram illustrating an example operation for sensing a movement of a rescuee's terminal according to an example embodiment of the present disclosure.

Referring to FIG. 18, a distress site may, for example, refer to a building on fire. Multiple sensors 1804 are positioned inside the building to sense a dangerous situation, and a router (or a gateway) 1802 may be provided in each section separated physically or spatially to communicate with rescuees' terminals 1806 and sensors 1804 in a corresponding section. The router 1802 may periodically or aperiodically monitor the occurrence of distress signals or sensing data from the rescuees' terminals 1806 or sensors 1804 pre-registered, sensable by the router 1802, or positioned around.

The routers 1802 may sense signals (e.g., distress signals or identification signals) generated from the rescuees' terminals and report the result of sensing to the rescuer's terminal 1830, a building management server 1820, or a rescue team's server 1822. For example, the result of sensing may be delivered to the rescue team's server 1822 via at least one of the rescuer's terminal 1830 and the management server 1820. The rescuer's terminal 1830 or the server 1820 or 1822 may determine whether each rescuee's terminal 1806 moves or not and a movement route based on the sensing result from the routers 1802.

As an example, the rescuee's terminal 1832 moves from the area of the router R1 through the area of the router R2 to the area of the router R4. First, the router R1 senses a signal from the rescuee's terminal 1832 to sense that the rescuee's terminal 1832 is positioned in its area and reports first rescuee information containing identification information about the rescuee's terminal 1832 to the rescuer's terminal 1830 or server 1810 or 1820. The first rescuee information may further include at least one of the received strength of the signal from the rescuee's terminal and information or number of times when the signal is sensed, along with the identification information about the rescuee's terminal 1832. When the router R1 senses signals from the rescuee's terminal 1832 several times, the first rescuee information may include information or number of times when the signals are sensed and a plurality of received strengths for the rescuee's terminal 1832.

The rescuer's terminal 1830 or the server 1820 or 1822 stores information indicating that the rescuee's terminal 1832 is located in the area of the router R1 in response to the reception of the first rescuee information. Likewise, second rescuee information about the rescuee's terminal 1832 from the router R2 and third rescuee information about the rescuee's terminal 1832 from the router R4 may be reported to the rescuer's terminal 1830 or the server 1810 or 1820. The rescuer's terminal 1830 or server 1820 or 1822 may store a moving route of the rescuee's terminal 1832 in response to the reception of the first and second rescuee information.

The rescuer's terminal 1830 or the server 1820 or 1822 may recognize that the rescuee's terminal 1832 moves through the areas of the routers R1, R2, and R4 based on the rescuee information reported from the routers and may determine to first rescue the rescuee carrying the terminal 1832. Then, a highest priority is assigned to the area of the router R4 where the rescuee 1832 is finally sensed.

According to an example embodiment of the present disclosure, the rescuer's terminal 1830 may directly receive distress signals from the rescuee's terminal 1832 positioned around. The rescuer's terminal 1830 measures the received signal strength and AOA of distress signals by periodically scanning the distress signals and computes the distance from the rescuee's terminal 1832 based on the received signal strength. The location of the rescuee's terminal 1832 may be determined based on the distance computed and the AOA measured. The rescuee's terminal 1830 determines whether the AOA and received signal strength (or location) of the rescuee's terminal 1832 varies depending on the result of scanning the distress signals, and when a variation in the AOA and received signal strength (or location) exceeds a predetermined range, determines that the rescuee's terminal 1832 is on the move and requires a quick rescue. Then, the rescuer's terminal 1830 displays search information indicating and guiding to the location where the rescuee's terminal 1832 has finally been sensed.

Various example embodiments of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to example embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to example embodiments of the present disclosure may be implemented by a computer or a portable terminal including a controller and a memory, and the memory may be an example machine-readable storage medium that may properly retain program (s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to various example embodiments of the present disclosure may receive the program from a program providing device via wire or wirelessly and store the same. The program providing apparatus may include a memory for storing a program including instructions enabling a program processing apparatus to perform a method according to an embodiment of the present disclosure and data necessary for a method according to an example embodiment of the present disclosure, a communication unit for performing wired or wireless communication with a graphic processing apparatus, and a controller transmitting the program to the graphic processing apparatus automatically or as requested by the graphic processing apparatus.

The various example embodiments disclosed herein are provided merely for better understanding of the present disclosure, and the present disclosure should not be limited thereto or thereby. The various example embodiments set forth herein are merely examples, and it will be apparent to one of ordinary skill in the art that various changes may be made thereto without departing from the scope of the present disclosure. The scope of the present disclosure should be defined by the following claims.

What is claimed is:

1. A method for providing search information, the method comprising:
   receiving sensing data from at least one sensor;
   receiving a distress signal from at least one user device; and
   displaying the search information through a display screen of a wearable device for guiding to an area to be searched determined based on the sensing data and the distress signal,
   wherein the wearable device comprises a fire-retardant helmet, the area is determined based on a rescue priority, and the rescue priority is determined based on a rescuee count, a temperature, and a harmful material concentration, and the area is displayed in different scheme based on the rescue priority.

2. The method of claim 1, further comprising: identifying a number of rescuees in one or more areas based on the distress signal; analyzing the sensing data related to the one or more areas; and determining one of the one or more areas as the area to be searched.

3. The method of claim 1, wherein the distress signal includes at least one of: identification information, location information, bio information regarding the user device, the sensing data, and image information.

4. The method of claim 1, wherein at least one of the distress signal and the sensing data is received through one of: at least one router and at least one server.

5. The method of claim 1, wherein the search information is received from a server, and wherein the server determines the area to be searched based on the distress signal and the sensing data and generates the search information related to the guided area.

6. The method of claim 1, wherein the search information indicates at least one of: guide information for guiding to a search area, a name, degree of danger, and type of danger related to the search area.

7. The method of claim 1, wherein the sensing data includes at least one of: identification information regarding each sensor, a sensor type, location information, and a value sensed.

8. A method for providing search information, the method comprising:
   receiving sensing data from at least one sensor;
   receiving rescuee information generated based on a distress signal transmitted from at least one user device;

determining an area based on the sensing data and the rescuee information; and transmitting search information for guiding to the determined area to a wearable device to be displayed on a display screen of the wearable device, wherein the wearable device comprises a fire-retardant helmet, the area is determined based on a rescue priority and the rescue priority is determined based on a rescuee count, a temperature, and a harmful material concentration, and the area is displayed in different scheme based on the rescue priority.

9. The method of claim 8, further comprising: identifying a number of rescuees in one or more areas based on the rescuee information; analyzing the sensing data related to the one or more areas; and determining one of the one or more areas as a search area.

10. The method of claim 8, wherein the sensing data includes at least one of: identification information regarding each sensor, a sensor type, location information, and a value sensed.

11. The method of claim 8, wherein the rescuee information includes at least one of: a number of rescuees in the determined area, identification information, location information, bio information regarding the user device, the sensing data, and image information.

12. The method of claim 8, wherein at least one of the rescuee information and the sensing data is received through one of: at least one router, at least one portable electronic device, and at least one server.

13. The method of claim 8, wherein the search information indicates at least one of: guide information for guiding to a search area, a name, degree of danger, and type of danger related to the search area.

14. A wearable device providing search information, the wearable device comprising:

communication circuitry configured to receive sensing data from at least one sensor and to receive a distress signal from at least one user device; and a display configured to display the search information on the wearable device for guiding to an area to be searched determined based on the sensing data and the distress signal, wherein the wearable device comprises a fire-retardant helmet, the area is determined based on a rescue priority, and the rescue priority is determined based on a rescuee count, a temperature, and a harmful material concentration, and the area is displayed in different scheme based on the rescue priority.

15. A server providing search information, the server comprising:

communication circuitry configured to receive sensing data from at least one sensor and to receive rescuee information generated based on a distress signal transmitted from at least one user device; and a processor configured to determine an area based on the sensing data and the rescuee information and to transmit the search information for guiding to the determined area through the communication circuitry to a wearable device to be displayed on a display screen of the wearable device, wherein the wearable device comprises a fire-retardant helmet, the area is determined based on a rescue priority, and the rescue priority is determined based on a rescuee count, a temperature, and a harmful material concentration, and the area is displayed in different scheme based on the rescue priority.

* * * * *